(12) United States Patent
Rousseau et al.

(10) Patent No.: US 8,417,670 B1
(45) Date of Patent: *Apr. 9, 2013

(54) DYNAMIC MEMBERSHIP MANAGEMENT IN A DISTRIBUTED SYSTEM

(75) Inventors: Benjamin A. Rousseau, Somerville, MA (US); Carl Hu, Arlington, MA (US); Frederick A. Tompkins, Londonderry, NH (US)

(73) Assignee: Progress Software Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,934

(22) Filed: Mar. 28, 2012

Related U.S. Application Data

(63) Continuation of application No. 12/728,574, filed on Mar. 22, 2010, now Pat. No. 8,171,028, which is a continuation of application No. 11/404,155, filed on Apr. 13, 2006, now Pat. No. 7,739, 235.

(60) Provisional application No. 60/671,373, filed on Apr. 13, 2005.

(51) Int. Cl.
*G06F 7/00* (2006.01)

(52) U.S. Cl. ........................................................ 707/638

(58) Field of Classification Search .................. 707/638, 707/737
See application file for complete search history.

(56) References Cited

U.S. PATENT DOCUMENTS

| | | | |
|---|---|---|---|
| 6,052,695 A | 4/2000 | Abe et al. | |
| 6,154,847 A | 11/2000 | Schofield et al. | |
| 6,178,519 B1 | 1/2001 | Tucker | |
| 6,353,869 B1 | 3/2002 | Ofer et al. | |
| 6,493,726 B1 | 12/2002 | Ganesh et al. | |
| 6,574,749 B1 | 6/2003 | Parsons | |
| 6,578,159 B1 | 6/2003 | Kitagawa et al. | |
| 6,665,814 B2 | 12/2003 | Hobson et al. | |
| 6,898,791 B1 | 5/2005 | Chandy et al. | |
| 7,146,366 B2 | 12/2006 | Hinshaw et al. | |
| 7,181,525 B1 | 2/2007 | Hebel et al. | |
| 7,356,531 B1 | 4/2008 | Popelka et al. | |
| 7,506,039 B2 | 3/2009 | Hammons et al. | |
| 2002/0129087 A1 | 9/2002 | Cachin et al. | |

(Continued)

OTHER PUBLICATIONS

Agrawal, Divyakant et al., "Exploiting Atomic Broadcast in Replicated Databases," 1997, 8 pages [online] [Retrieved on Jan. 30, 2006] Retrieved from the Internet: <URL: http://citeseer.ist.psu.edu/cache/papers/cs/1240/http:zSzzSzwww.cs.ucsb. eduzSzioanazSzeuropar97.pdf/agrawal96exploiting.pdf>.

(Continued)

*Primary Examiner* — Truong Vo
(74) *Attorney, Agent, or Firm* — Patent Law Works LLP

(57) ABSTRACT

Transactional database replication techniques are disclosed that do not require altering of the database management system implementation. A replicator module includes a dynamic membership manager, which is configured to manage the persistent membership of a coordination group. The persistent membership can be, for example, a durable set of sites that can replicate changes amongst themselves. Changes from sites not in the persistent membership are discarded. The set of recovered members is a subset of the persistent membership. The persistent membership changes incrementally by either removing or adding members. Failed members may still be part of the persistent membership. The dynamic membership manager module manages the modification of the persistent membership, initialization of replicas, and propagation of membership information.

20 Claims, 8 Drawing Sheets

U.S. PATENT DOCUMENTS

| | | | |
|---|---|---|---|
| 2002/0194523 | A1 | 12/2002 | Ulrich et al. |
| 2003/0028819 | A1 | 2/2003 | Chiu et al. |
| 2003/0135478 | A1* | 7/2003 | Marshall et al. ............ 707/1 |
| 2003/0204786 | A1* | 10/2003 | Dinker et al. ............ 714/43 |
| 2003/0220990 | A1 | 11/2003 | Narayanan et al. |
| 2004/0010544 | A1 | 1/2004 | Slater et al. |
| 2004/0030739 | A1 | 2/2004 | Yousefi'zadeh |
| 2004/0068563 | A1 | 4/2004 | Ahuja et al. |
| 2004/0128269 | A1 | 7/2004 | Milligan et al. |
| 2005/0021850 | A1 | 1/2005 | Minyard |
| 2005/0022047 | A1 | 1/2005 | Chandrasekaran |
| 2005/0033777 | A1 | 2/2005 | Moraes et al. |
| 2006/0090095 | A1 | 4/2006 | Massa et al. |
| 2006/0129872 | A1 | 6/2006 | Fung et al. |
| 2007/0028139 | A1 | 2/2007 | Wahl et al. |
| 2008/0256299 | A1 | 10/2008 | Iyengar et al. |

OTHER PUBLICATIONS

Amir, Yair et al., "From Total Order to Database Replication, Technical Report CNDS-2001-6," Nov. 5, 2001, 26 pages [online] [Retrieved on Jan. 30, 2006] Retrieved from the Internet: <URL: http://www.cnds.jhu.edu/pub/papers/cnds-200 1-6 . pdf>.

Gray, Jim et al., "The Dangers of Replication and a Solution," 1996, pp. 173-182 [online] [Retrieved on Jan. 30, 2006] Retrieved from the Internet: <URL: http://www-2.cs.cmu.edu/-natassalcourses/15-823/F02/papersi gray96danger.pdf>.

Jajodia, S. et al., "Dynamic Voting Algorithms for Maintaining the Consistency of a Replicated Database," ACM Transactions on Database Systems, Jun. 1990, pp. 230-280, vol. 15, No. 2.

Kemme, B., "Database Replication for Clusters of Workstations," Dissertation, Swiss Federal Institute of Technology Zurich, 2000 [Retrieved on Jul. 9, 2007] Retrieved from the Internet <URL:http://www.cs.mcgill.cal-kemme/papers/phd-dina4.pdf>.

Moser, L.E. et al., "Extended Virtual Synchrony," 1994, 10 pages [online] [Retrieved on Jan. 30, 2006] Retrieved from the Internet: <URL: http://www.cs.jhu.edu/-yairamir/dcs-94.ps>.

Schneider, Fred B., et al., "Implementing Fault-Tolerant Services Using the State Machine Approach: A Tutorial," ACM Computing Surveys, Dec. 1990, vol. 22, No. 4, pp. 299-319 [online] [Retrieved on Jan. 30, 2006] Retrieved from the Internet: <URL:httpllwww.cs.cornell.edu/ibs/publications/SMSurvey.pdf>.

Stanoi, I. et al., "Using Broadcast Primitives in Replicated Databases," Proceedings of ICDCS '98, May 1998, Amsterdam, The Netherlands, 8 pages [online] [Retrieved on Jan. 30, 2006] Retrieved from the Internet: <URL: http://www.cs.ucsb.edu/-dsl/publications/1998/stanoi__icdcs.pdf>.

Vitenberg, Roman et al., "Group Communication Specifications: A Comprehensive Study," Sep. 17, 1999,50 pages [online] [Retrieved on Jan. 30, 2006] Retrieved from the Internet: <URL: http://theory.Ics.mit.edu/-idish/ftp/gcs-survey-tr.pdf>.

International Search Report and Written Opinion, PCT/US2006/014064, Sep. 26, 2007, 9 pages.

* cited by examiner

DYNAMIC MEMBERSHIP MANAGEMENT IN A DISTRIBUTED SYSTEM

RELATED APPLICATIONS

This application is a continuation of prior U.S. application Ser. No. 12/728,574, filed Mar. 22, 2010, which is a continuation of prior U.S. application Ser. No. 11/404,155, filed Apr. 13, 2006, which claimed the benefit of U.S. Provisional Application No. 60/671,373, filed on Apr. 13, 2005, which is herein incorporated in its entirety by reference. In addition, this application is related to U.S. application Ser. No. 11/270,196, filed Nov. 8, 2005, and titled "Fault Tolerant Distributed Lock Management" and U.S. application Ser. No. 11/292,055, both filed Nov. 30, 2005, and titled "Update-Anywhere Replication of Distributed Systems." Each of these applications is herein incorporated in its entirety by reference.

FIELD OF THE INVENTION

The invention relates to distributed systems, and more particularly, to transactional database replication.

BACKGROUND OF THE INVENTION

Modern computer systems typically consist of a CPU to process data, a networking interface to communicate to other computer systems, and one or more durable storage units. The system may stop processing due to power failure, program incorrectness, or a hardware fault. Such failures are often called process failures. The durable storage units are able to keep the data intact while the fault is repaired.

A set of these computer systems can be networked to form a cluster. Although the network is generally reliable, occasional faults may occur to disrupt communication between certain nodes or sets of nodes. This disruption in communication is often called a network partition.

Each of these nodes runs a transactional storage system that both reads and writes data (a database management system). Some of this data is concurrently accessed by applications operating on different nodes. To guarantee data consistency, transactional database replication techniques are used to manage and regulate access to that data. However, such conventional replication techniques are associated with a number of problems.

For instance, conventional replication systems typically require an administrator to stop all applications, then stop the databases running at each of the nodes in the replicating group, then go to each node and notify it about the change in membership (usually by editing a table), then restarting the databases on each of these machines, then restarting the applications. This necessity of having to stop the databases running in the system can be undesirable.

What is needed, therefore, are transactional database replication techniques that do not require stopping of databases during replication.

SUMMARY OF THE INVENTION

One embodiment of the present invention provides a method for dynamically managing persistent membership of a coordination group in a distributed environment. The coordination group includes a number of sites included in a persistent membership, with one or more of the sites including a database and a registrar. The method includes sending (by an entrant seeking to become a member of the persisted membership) a Membership Request, and receiving (by a registrar that is a member of the persistent membership) the Membership Request. The method continues with modifying (by the registrar) the persistent membership for the entrant. Once the persistent membership has changed, the method continues with disconnecting (by the registrar) from the coordination group, and initializing a database for the entrant. In one particular embodiment, modifying the persistent membership for the entrant includes sending (by the registrar) a Membership Change message to other sites in the coordination group, and then receiving (by the registrar) the Membership Change message in total persisted order. The method continues with proceeding (by the registrar and/or entrant) with initializing the entrant database in response to the persistent membership being changed. The method may include reconnecting (by the registrar) to the coordination group after initialization of the entrant database, and connecting (by the entrant) to the coordination group after initialization of the entrant database. In one particular case, should connection between the registrar and the entrant be severed, the entrant can reconnect to any available registrar via a group communication system, and recover. In another particular case, initializing the entrant database is carried out using backup/historical initialization. In such a case, the Membership Request includes an action ID of a last action that was applied to the entrant's database, the action ID uniquely identifying the persistent membership. In response to the registrar not containing historical update information for this action ID, the method may further include refusing (by the registrar) to proceed. The method may include acquiring (by the registrar) a distributed lock on the coordination group and entrant name, and then examining (by the registrar upon receiving the distributed lock) the persistent membership to ensure that no other site utilizes the entrant's name, and then refusing (by the registrar) to proceed with initializing the database in response to the entrant's name being already in use. In one such case, acquiring the distributed lock is carried out by a fault tolerant distributed lock manager associated with the registrar. Here, the method may further include aborting (by the fault tolerant distributed lock manager) any transactions in process, and releasing (by the fault tolerant distributed lock manager) any locks held by the registrar, and disconnecting (by the registrar) from a group communication system providing an extended virtual synchrony service to the coordination group thereby allowing the registrar to provide a consistent snapshot to the entrant. In another particular case, initializing the entrant database is carried out using snapshot initialization, and the entrant's database is initialized with contents of the registrar's database. In another particular case, initializing the entrant database is carried out using verify/update initialization. Here, the initializing may further include comparing entrant and registrar database contents, and resolving discrepancies. In response to the entrant including new data, the method may further include creating (by the entrant) actions corresponding to the new data and indicating total persisted order of those actions is not yet known. In another particular case, initializing the entrant database is carried out using backup/historical initialization. Here, the initializing may further include disconnecting (by the registrar) from a group communication system servicing the coordination group thereby inhibiting further update actions, and sending (by the registrar) all Green actions after last applied action at the entrant to the entrant (where Green actions are those whose total persisted order is known and confirmed), and applying (by the entrant) those sent Green actions. The method may further include inhibiting (by a distributed lock manager) transactions during database initialization. In another particular case, the registrar can only service an entrant if the registrar has attained quorum based on a quorum requirement, and the quorum requirement can be loosened to allow more quorums by not counting previous quorum members that have left or have been evicted. In another particular case, members are allowed to become registrars only if they have participated in at least one quorum. The method may include using a flow control protocol so as not to exceed any network data flow limits.

Another embodiment of the present invention provides a machine-readable medium (e.g., one or more compact disks, diskettes, servers, memory sticks, or hard drives) encoded with instructions, that when executed by one or more processors, cause the processor to carry out a process for dynamically managing persistent membership of a coordination group in a distributed environment (recall that a coordination group includes a number of sites included in a persistent membership, with one or more of the sites including a database and a registrar). This process can be, for example, similar to or a variation of the previously described method.

Another embodiment of the present invention provides a system for dynamically managing persistent membership of a coordination group in a distributed environment. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
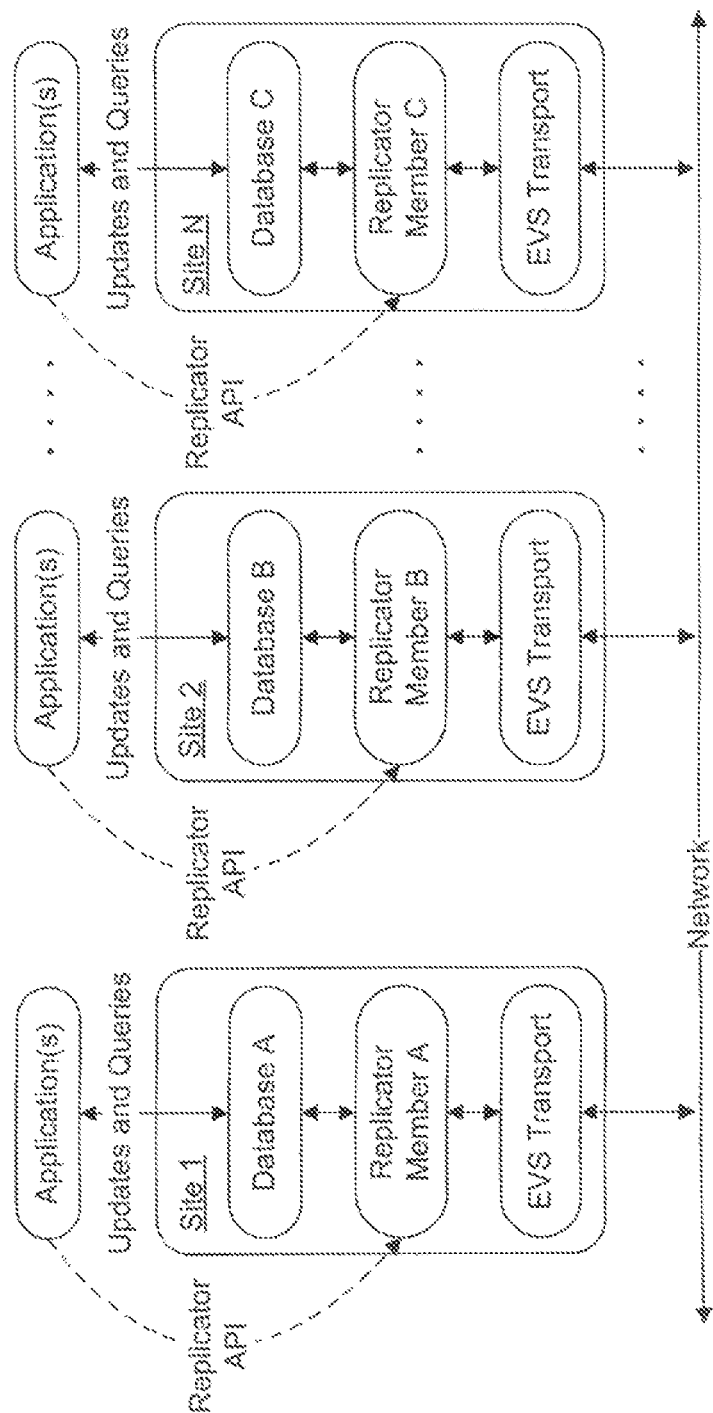
FIG. 1 is a block diagram of a system for replicating autonomous databases distributed across a network, configured in accordance with an embodiment of the present invention.

Transactional database replication techniques are disclosed that employ a dynamic membership management. Dynamic membership management allows modification of membership of a coordination group without interrupting replication availability for the general membership.

General Overview

Each of the "sites" in a network of computer systems can run a transactional storage system (also called a database management system). In one embodiment of the present invention, the data in each of these storage systems is replicated to some or all of the others. There can be several applications concurrently updating and reading the data at a particular site. Also, the sites can operate autonomously and be concurrently updated with respect to each other. Updates made at one site can be transferred to the other sites. To each application or application instance, the replica of the database appears as if it were the only database in the system. Effective transactional database replication is provided.

One such embodiment integrates a fault tolerant lock manager (such as the one described in the previously incorporated U.S. application Ser. No. 11/270,196) with a persistent total order algorithm to build a transactional replication system that does not require the modification of the databases. In one particular case, the manner of this integration involves an organization of functions including database transaction commit, transaction commitment notification to the replication system, capture and recording of changes made to the data stored in the database, retrieving the changes from the database, sending the changes to the other replicas of the system, and transferring associated locks to others as needed. The set of sites containing the various replicas is termed a "coordination group."

In addition, a system resulting from this integration is a general replication system capable of operating with "off the shelf" database management systems, with performance and reliability characteristics superior to earlier designs. This embodiment of the invention is suitable, for example, for applications such as highly available clusters, update-anywhere data caching, as well as heterogeneous database replication. The database management systems employed in a single coordination group may utilize the relational model. Or other data models such as those provided by object databases, simultaneously.

The replication techniques employed can be method-based (such those described in the previously incorporated U.S. application Ser. No. 11/292,055). There are many ways to realize these replication techniques in an implemented system. In one particular implementation, the majority of the functional logic is encapsulated in a module referred to herein as a replicator. The replicator module includes a dynamic membership manager (DMM), which is configured to manage the persistent membership of a coordination group. In one particular configuration, the persistent membership is a durable set of servers for other sites) that can replicate changes amongst themselves. Changes from servers not in the persistent membership are discarded. The set of recovered members is a subset of the persistent membership. The persistent membership changes incrementally by either removing or adding members. Failed members may still be part of the persistent membership. In short, the DMM module manages the modification of the persistent membership, initialization of replicas, and propagation of membership information.

For ease of exposition, the replicator module is specified in detail based on its inputs, outputs, and logic implemented within the replicator. Numerous implementations and configurations will be apparent in light of this disclosure, and the present invention is not intended to be limited to any one particular such embodiment. The replication techniques described herein can be used, for instance, to replicate database management systems distributed across and connected by a message passing network, and support a variety of data storage technologies such as traditional durable transactional databases as well as in-memory data storage systems, and a variety of data types such as relational, flat file, XML, and object-oriented data. The techniques described herein also provide database applications guaranteed levels of distributed transactional data consistency (e.g., serializable) for both reads and writes. The techniques also support the ability of applications distributed across a network to perform updates concurrently, and the ability to replicate many standard database systems without needing to modify their intrinsic behavior or needing them to be aware of the replicator, and the ability to tolerate network and process failures without any change to the data consistency guarantees provided to the applications. In short, dynamic membership management is enabled, which can be used in conjunction with fault tolerant, update-anywhere, transactional replication of autonomous databases distributed across and connected by a message-passing network, thereby providing a robust distributed system. Numerous computing environments and applications that can benefit from the techniques described herein will be apparent in light of this disclosure.

System Architecture

FIG. 1 is a block diagram of a system for replicating autonomous databases distributed across a network, configured in accordance with one embodiment of the present invention.

As can be seen, the system includes a number (N) of sites (or node) each communicatively coupled to a network via an extended virtual synchrony (EVS) transport module. Each site includes one or more applications that can access the local database of that site e.g., database A of site 1, database B of site 2, and database C of site N). In addition, applications from one particular site can access the databases of other sites. Thus, the resources stored in any one database can be concurrently accessed by applications operating on different sites. The applications at each site can be executed, for example, by a processing system (not shown) such as a server, work station, laptop, personal digital assistant, or any kind of computing system.

A replicator module local to each database is programmed or otherwise configured to replicate the set of databases with each other. Each instance of the replicator module executes identical logic, as will be described herein. Note, however, that correct operation of the logic requires certain configuration information unique to each instance. In particular, each replicator module instance is configured to be associated with its own database instance as well as its own unique identifier. A particular instance of the replicator module configured in this manner is termed a member (e.g., replicator members A, B, and C).

Recall that a set of sites including the database replicas is referred to herein as a coordination group. Any member belongs to a coordination group. The replicator module replicates the data in the databases of all members that are in the same coordination group. Not all sites need a replicator module, unless there is only one site in the coordination group. However, it is also acceptable for each site to have its own replicator module.

In addition to the associated unique identifier and database, each instance of the replicator module is configured to locally store a persistent membership list including the unique identifiers of all of the members of the coordination group. The contents of the membership lists associated with each member belonging to the same coordination group are identical. This membership list is managed by a dynamic membership module as will be described in turn.

Each database may have multiple applications that concurrently query and update the data stored in the database. Note that in this example configuration, an application notifies the replicator module via a replicator API of transaction begins, commits, and lock requests. However, this direct communication from the application to the replicator module is not necessary to the design of the replicator module. For instance, in an alternative embodiment, the database can be configured or modified to directly inform the replicator module of these notifications. In another embodiment, the database driver or provider (e.g., JDBC, .Net, ODBC, or other middleware) can be programmed or otherwise configured to intercept operations (e.g., begin, update, commit) from an application. In such a configuration, the driver/provider can be further configured to inform the replicator module of necessary notifications. Another embodiment is to leverage standard database customization facilities like stored procedures and triggers to provide the replicator module with necessary notifications. For example, update triggers can be used to provide the replicator module with an OnLock event.

If a coordination group contains more than one member, the members communicate to each other via the communications network (e.g., TCP/IP, NTS, Ethernet, etc), as shown in FIG. 1. The network may intermittently fail, partitioning the members into a variety of configurations. For example, the initial configuration {A,B,C} may be partitioned into two configurations: {A,B} and {C}. In this use of the replicator module, the three applications may concurrently query and update their respective databases, as shown in FIG. 1. The replicator module distributes these changes and updates of data from the applications such that there is no semantic difference from the applications point of view in terms of data consistency in this system as compared to a system with a single database that is receiving concurrent queries and updates from multiple applications.

This equivalence in data consistency from the perspective of the applications is what is meant by transactional replication. Although there is equivalence in data consistency, there are significant advantages in terms of performance and availability in the embodiment depicted in FIG. 1 over a system configuration with a single database that is receiving concurrent queries and updates from multiple applications. Furthermore; when applications can operate correctly with less than full serializable isolation (e.g., read-committed), the replicator module instances in FIG. 1 can be configured to achieve still higher system throughput and fault tolerance.

Each application within any node has access to its local database, as well as access to the databases of other nodes. In general, an application is any program or system that can read, add, delete, modify, update, or otherwise manipulate data stored in one or more of the databases included in the distributed system. The applications can be; for example, user activated (e.g., banking or accounting software), or automatically activated by a system (e.g., inventory control software programmed to run automatically on a daily basis).

The database of each node stores the resources that are used by one or more of the applications. As is known, a database is a collection of structured data. Clients can access the data by submitting transactions, consisting of a set of commands that follow the ACID properties (atomicity, consistency, isolation, and durability). Each site from the server set maintains a private copy of the database. The initial state of the database is identical at all servers. A change set defines a transition from the current state of the database to the next state. The organization of the databases can be the same (e.g., all relational databases) or different (e.g., some relational databases and some object oriented databases). Any type or combination of data storage facilities can be used, with heterogeneous or homogenous data.

The EVS transport module imposes an ordering on all data items in the global model, and can be implemented using conventional total order techniques. In one particular embodiment, the EVS transport module is implemented as described in "From Total Order to Database Replication," by Yair Amir and Ciprian Tutu. Likewise, the EVS transport module can be implemented as described in "Extended Virtual Synchrony", L. E. Moser, Y. Amir, P. M. Meltiar-Smith, and D. A. Agarwal. Note that these papers are available online, and are also included in Appendix 13 of the previously incorporated U.S. Provisional Application No. 60/671,373. Further note that an Extended Virtual Synchrony Transport is one specific implementation of a total order transport module, and that other embodiments of the present invention can be implemented with total order transport techniques other than extended virtual synchrony transports, as will be appreciated in light of this disclosure.

Although each of the replicator module, application(s), and database of each site are shown as distinct components in this example embodiment, other configurations can be used as well. For example, any one or all of these components can be programmed or otherwise integrated into the other (e.g., the replicator module and EVS transport can be integrated along with the database onto a server). Conventional or custom networking and/or inter-process protocols and techniques can be used to carryout communication between the components in any one site, as well as between sites. In addition, wired and/or wireless technology can be employed for intra-site and inter-site communication. For convenience of illustration, each of the database, replicator module, and EVS transport are depicted as residing on the same machine. In other embodiments, each module or component can execute on a separate machine or a combination of two or more machines, if so desired.

Replicator Module

Figure 2A:
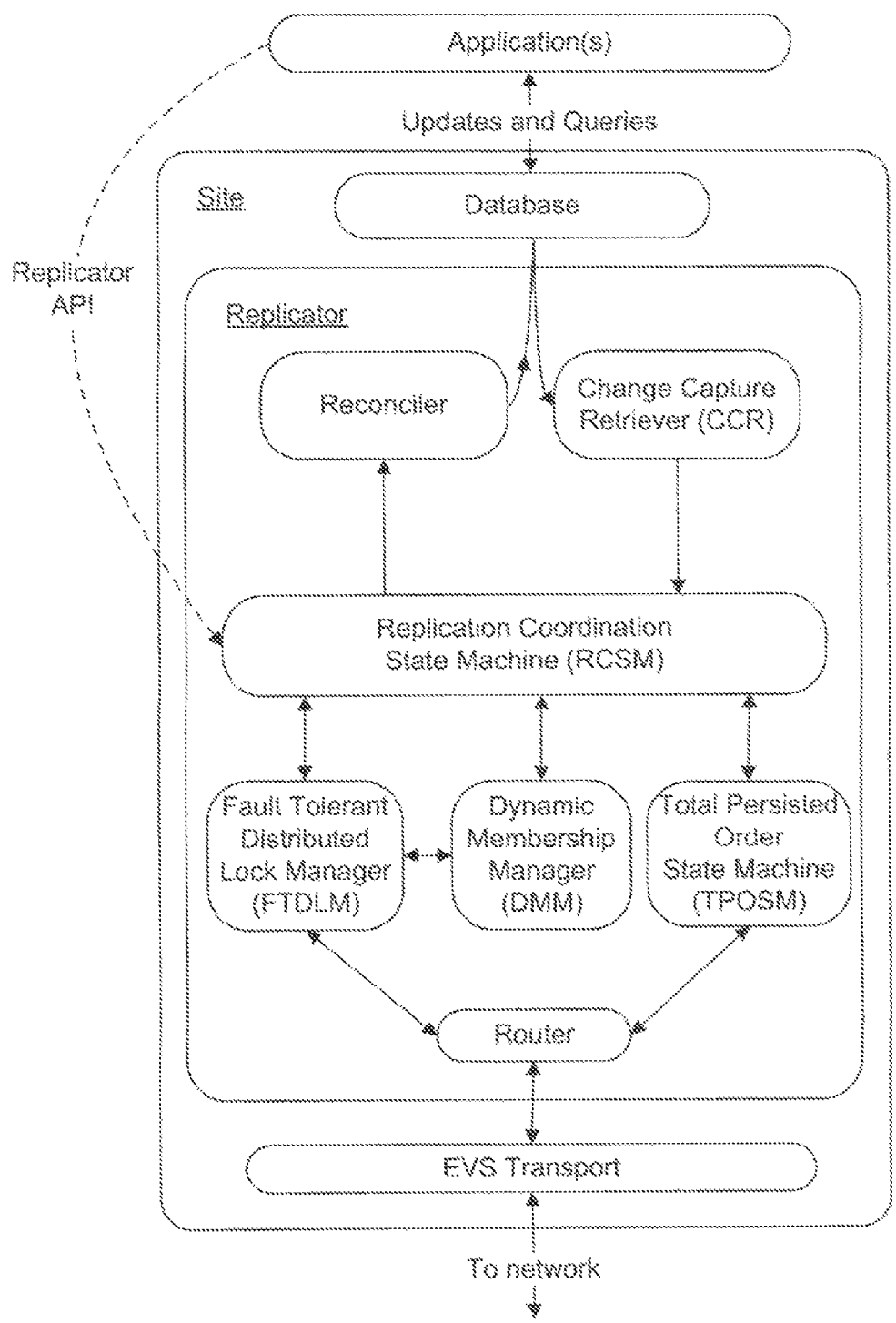
FIG. 2a is a block diagram of a replicator module shown in FIG. 1, configured in accordance with an embodiment of the present invention.

FIG. 2a is a block diagram of a replicator module shown in FIG. 1, configured in accordance with an embodiment of the present invention. As previously explained, the replicator module is communicatively coupled between the database and the EVS transport (or other suitable total order transport module). Within the replicator are shown modules required to implement the functionality described herein. In particular, this embodiment includes a reconciler module, a change capture retriever module, a replication coordination state machine, a fault tolerant distributed lock manager module, a dynamic membership manager module, a total persisted order module, and a router. Arrows generally represent the direction of data flow between the modules.

The reconciler module takes as input change sets from the replication coordination state machine (RCSM) and updates the data in the database with these changes. The reconciler module is essentially more of an adaptor than a state machine, and functions to abstract the database implementation, data schema, data format, and query language specific aspects of reconciliation away from the RCSM (and other modules of the replicator). The reconciler module input event is ReconcileChangeSet. The RCSM passes a change set to the Reconciler via this event. The reconciler module outputs database specific update language.

The change capture retriever (CCR) module is used by the RCSM to retrieve committed changes from the local database. The CCR module returns change sets to the RCSM. The CCR module abstracts away differences in database structure, schema, and query language from the other components in the replicator. The method of extraction is dependent on the database system, as will be apparent in light of this disclosure. A change capture mechanism ensures that changes were previously captured during the execution of the transaction and made available to the CCR. In one particular embodiment, there are two inputs to the CCR module: LazyRetrieveChargeSets and ForceRetrieveChangeSets. The RCSM calls the LazyRetrieveChangeSets function when the RCSM realizes that a transaction has committed (thereby implying that there are change sets to be retrieved) and there are no waiters for the distributed locks made available by the commit of this transaction. This allows the change set to be asynchronously retrieved, significantly improving throughput at the cost of latency. A monotonically increasing unique identifier is associated with each request for change set retrieval. This identifier is used later in an AllChangesRetrieved event to identify which request has been sent. The RCSM calls the ForceRetrieveChangeSets function when the RCSM realizes that a transaction has committed (thereby implying that there are change sets to be retrieved) and there are waiters for the distributed locks freed by the commit of this transaction. Before the locks can be released, all changes are first sent to the TPOSM. To minimize latency, the CCR module ensures that the retrieval is done as soon as possible, in one particular embodiment. The output of the CCR module in this embodiment is AllChangesRetrieved. After each Retrieve* request, there is at least one retrieval from the database. After the retrieval is done, the CCR module uses the AllChangesRetrieved event to signal the RCSM which Retrieve* request has been serviced and the change set that was retrieved. Note that change set retrieval is a significant performance cost. However, a performance optimization can be implemented. In particular, observe that a single change set retrieval to the database is sufficient to service not just the last Retrieve received by the CCR module before the retrieval, but all Retrieve requests received by the CCR module that precede the retrieval. Thus, a single retrieval by the CCR module can result in the servicing of many Retrieve requests and may result in many corresponding AllChangesRetrieved events back to the RCSM. The CCR module maintains the invariant that there is at least one retrieval between the time the Retrieve* was called by the RCSM and the AllChangesRetrieved event is received by the RCSM.

The total persisted order state machine (TPOSM) is used by the RCSM to send change sets retrieved from the CCR to the other members of the coordination group. The TPOSM also delivers change sets to the RCSM, whereupon the RCSM will reconcile, if required, the change set using the reconciler module. The TPOSM uses the EVS transport. In one particular embodiment, the TPOSM is based on the method described in the previously incorporated "From Total Order to Database Replication" by Amir and Tutu, in accordance with one embodiment of the present invention. However, the algorithm described there is augmented and enhanced for the purposes of implementing the replication methods described herein. Also, various other aspects of the TPOSM were not specified in the Amir and Tutu paper. These aspects are described herein. Prior to discussing modifications to the original TPOSM, some of the original TPOSM is first defined (as described by Amir and Tutu). The original TPOSM consisted of seven states: NonPrimary, Regular Primary, Transitional Primary, Exchange States, Exchange Actions, Construct, Undecided and No. Changes are communicated over a network between members as actions, which are uniquely identified by a monotonically increasing per member index starting at 0 and the member unique identifier. The original TPOSM specified two sets of persistent actions: those in a local ongoing queue that have not been sent yet, and those in the action list which contains the total persisted order across all of the members. The original TPOSM defines three categories of actions: Red, Yellow, and Green. Red actions are actions whose total persisted order is not known, Yellow actions are those whose order is known but not confirmed, and Green actions are those whose order is known and confirmed. An action's color is set by marking the action; thus, an action is said to have been marked Red or Green when the accompanying ordering has taken place. A member unique identifier is also referred to herein as the member server ID. The monotonically increasing index is also referred to herein as the action index. An Action ID unique identifies an action and includes a server ID and an action index. Each TPOSM maintains several persistently stored data structures for managing ordering of actions and coordinating recovery. The first of these is the Red Cut, which stores the highest action index per server ID that the local member has persistently stored in order. The second are the Green Lines, which record the Action ID of the last action marked Green for every member. As discussed herein, actions in the action list are also called historical updates. Actions in the ongoing queue are not historical updates, as they have not been applied on other members yet.

In one embodiment of the present invention, the TPOSM defines a per action member relative total persisted order value. This value is unset until an action has beets marked Green at the local member, at which time it is assigned the next value of the total persisted order. Because the set of members of the coordination group can change with time, the total persisted order value on each action is relative to the local member. This value is primarily used in the RCSM for reconciliation purposes. This is a significant departure from the original TPOSM, as the replication method of this particular embodiment does not execute all updates in the total order.

In the original TPOSM, new changes from the replica are placed as uncolored actions in the ongoing queue and then communicated to other members during Regular Primary and NonPrimary. Because changes in the local replica are applied prior to being replicated across the coordination group, care must be taken when sending actions. When the changes are received by this member they are removed from the ongoing queue. In the original TPOSM, upon installation of primary any actions in the ongoing queue are sent, and upon recovery any actions in the ongoing queue are marked Red. The replicator module configured in accordance with an embodiment of the present invention takes a different approach. In this particular embodiment, rather than maintaining an ongoing queue, local actions are marked Red immediately. This leads to increased performance during recovery as well as a more deterministic total order as such actions are marked Green across all members upon installation of primary, rather than in batches at beginning of primary. There is also a performance improvement in maintaining a single list of actions, because less action copying is needed.

In the original TPOSM the notion of a most up to date member was introduced but not defined. Such member is responsible for retransmitting the action list of Green actions in the totally persisted order during the Exchange Actions state. Because in an arbitrary set of members each member may have different amounts of historical data, the algorithm for determining the most up to date member relies on the unique action identifiers rather than any member relative index. The replicator module configured in accordance with an embodiment of the present invention uses the following algorithm to determine the most up to date member. For each member of the coordination group, find the highest action marked Green across all the members in the configuration. Then for each member of the coordination group, form a set of members of the configuration that have marked the highest action Green. Then intersect those sets, and take the member with the maximal unique member ID.

In the original TPOSM, a retransmission protocol was not well defined. The most up to date member retransmitted the Green actions but it is unclear what the other members are to retransmit. The replicator module configured in accordance with an embodiment of the present invention specifies the protocol as the most up to date member retransmits Green actions then Red actions, and the other members retransmit Red actions in unique identifier order. Additionally, because the communication system is not considered an infinite sink and has limited resources, the replicator module of this particular embodiment specifies a flow control system based on the durable memory size of the actions that have been sent. This has two effects: first it prevents the communication system from being overwhelmed, and secondly it prevents remote out of date members from appearing to crash during recovery. Remote data members can appear to crash when the population of Green actions in their action lists and the application of those actions to their local replicas is time consuming. In this case, the communication system can erroneously conclude that those members have crashed, and evict them from the configuration thereby producing a configuration change. Because a configuration change involves restarting a recovery process or state machine, configuration changes are expensive, and avoiding them improves overall recovery performance.

The original TPOSM removes historical messages that are not needed because all members have them. The replicator module configured in accordance with an embodiment of the present invention implements this removal as a process that runs when the action list reaches a multiple of a configurable value, called the White Line limit. Each member can determine the last action marked Green on other members through the Green Line information in each action. If a member in the current configuration does not send any actions during long running primaries such a member can inhibit the removal of historical messages because other members won't know the last message that such a member has marked Green. Therefore, the replicator module of this particular embodiment is programmed or otherwise configured to send a status action at a frequency of half of the White Line limit if the local member has not sent any messages. This allows members to continue to remove historical information, thereby preventing the durable storage associated with the replicator module to grow without bound. In one such embodiment, the replicator module uses the following algorithm to determine how much historical data may be removed because it is no longer needed: for each member of the coordination group, determine the last action it has marked Green, and call this the least set. Find the action in the least set with the lowest total order value in the local action list. The last unneeded historical action is the action just prior to that least action with the lowest total order value in the local action list. All actions in the local action list prior to the last unneeded action may be discarded.

The TPOSM receives SendMessage as an input. SendMessage is used by the RCSM to send a change set to deliver to all other RCSM instances in the coordination group. The message is delivered guaranteeing total persisted order. The call is made in the context of a transaction and is made in the same transaction as the change retrieval executed by the CCR module. The TPOSM outputs OnMessage, which is used to notify the RCSM that a total persisted order message is ready (marked Green) to be reconciled. The message is delivered in the context of a transaction and provides both the message itself and a unique sequence number.

The fault tolerant distributed lock manager (FTDLM) enables fault tolerant replication, as will be appreciated in light of this disclosure. In one particular embodiment, the FTDLM takes as input notifications of write locks, transaction begins, and transaction commits. Here, notifications are directly from the applications. In other embodiments, these notifications can come from a detector so that the applications need not call the FTDLM directly. The FTDLM acquires and releases distributed locks. The FTDLM uses the same EVS transport as the TPOSM and sends messages in the same total order stream as the TPOSM. In one embodiment, the FTDLM is generally implemented as described in the previously incorporated U.S. application Ser. No. 11/270,196, except that the output is augmented with a notification LockTransferRequired and an input with ReleaseLockGranted. These additions to the FTDLM can be used to implement a Commit Rule as described in the previously incorporated U.S. application Ser. No. 11/292,055. This Commit Rule states that the lock release message is sent after the associated changes are sent via the TPOSM. In such an embodiment, the RCSM notifies the FTDLM when a commit has occurred and locks can be released via an OnXactCompleted event. The FTDLM is modified to provide an event to the RCSM to notify when a distributed lock transfer is required (e.g., ReleaseLockRequested). In particular, the FTDLM is modified by changing the logic in the lock queue state machine, as discussed with reference to FIGS. 3a and 3b in the previously incorporated U.S. application Ser. No. 11/292,055. The RCSM will notify the CCR module to retrieve the changes and send them. Then the RCSM will notify the FTDLM that it can now proceed with transferring the lock ownership (e.g., ProceedWithLockRelease).

Inputs of the FTDLM of one embodiment are as follows. The RCSM uses an OnBeginXact event to notify the FTDLM to prepare for the acquisition of a set of locks. The RCSM uses an OnLock event to notify the FTDLM to acquire a lock on a resource. The resource ID is included in the event. The RCSM uses the OnXactCompleted event to notify the RCSM that the current transaction is completed. The RCSM uses the ProceedWithLockRelease event to notify the FlDLM that it is okay to proceed with lock release on a resource. The output of the FTDLM includes RelaseLockRequested. This event is used to inform the RCSM that the FTDLM needs to release a lock, allowing the RCSM to arrange to first send all changes before the FTDLM sends a lock release message.

The replication coordinator state machine (RCSM) coordinates the operation of the CCR module, TPOSM, reconciler module. DMM, and FTDLM to implement the Read, Write, Commit, and Reconciliation Rules of the replication techniques as described herein.

The dynamic membership manager (DMM) is configured to manage the persistent membership of a coordination group.

As previously explained, the persistent membership can be, for example, a durable set of servers that can replicate changes amongst themselves. Changes from servers not in the persistent membership are discarded. The set of recovered members is a subset of the persistent membership. The persistent membership changes incrementally by either removing or adding members. Failed members may still be part of the persistent membership. Example functionality and implementation details of the DMM module will be discussed in further detail with reference to FIGS. 2b and 3-7.

With regard to the router module, both the FTDLM and the TPOSM use the same EVS transport (and the same total order group) to send and receive messages. The router module is used to multiplex (or otherwise communicate) input and outputs from the two components into the same EVS transport.

Each of the reconciler, CCR, RCSM, FTDLM, and TPOSM, as well as data flows therebetween, are discussed in further detail in the previously incorporated U.S. application Ser. No. 11/292,055 and U.S. Ser. No. 11/270,196.

In one particular embodiment, the replicator module is implemented with software (e.g., one or more set of instructions executing on one or more processors or encoded on one or more processor readable mediums). Alternatively, the replicator module can be implemented, for example, in hardware (e.g., gate-level logic) or a combination of hardware and software (e.g., microcontroller with a number of embedded routines for carrying out the functionality described herein). In addition, note that functionality of one module may be integrated into one or more other modules in various alternative embodiments. Also, note that the DMM functionality can be implemented without the FTDLM functionality (i.e., the dynamic membership management techniques described herein can be performed without fault tolerance and/or without lock management).

Dynamic Membership Manager

Figure 2B:
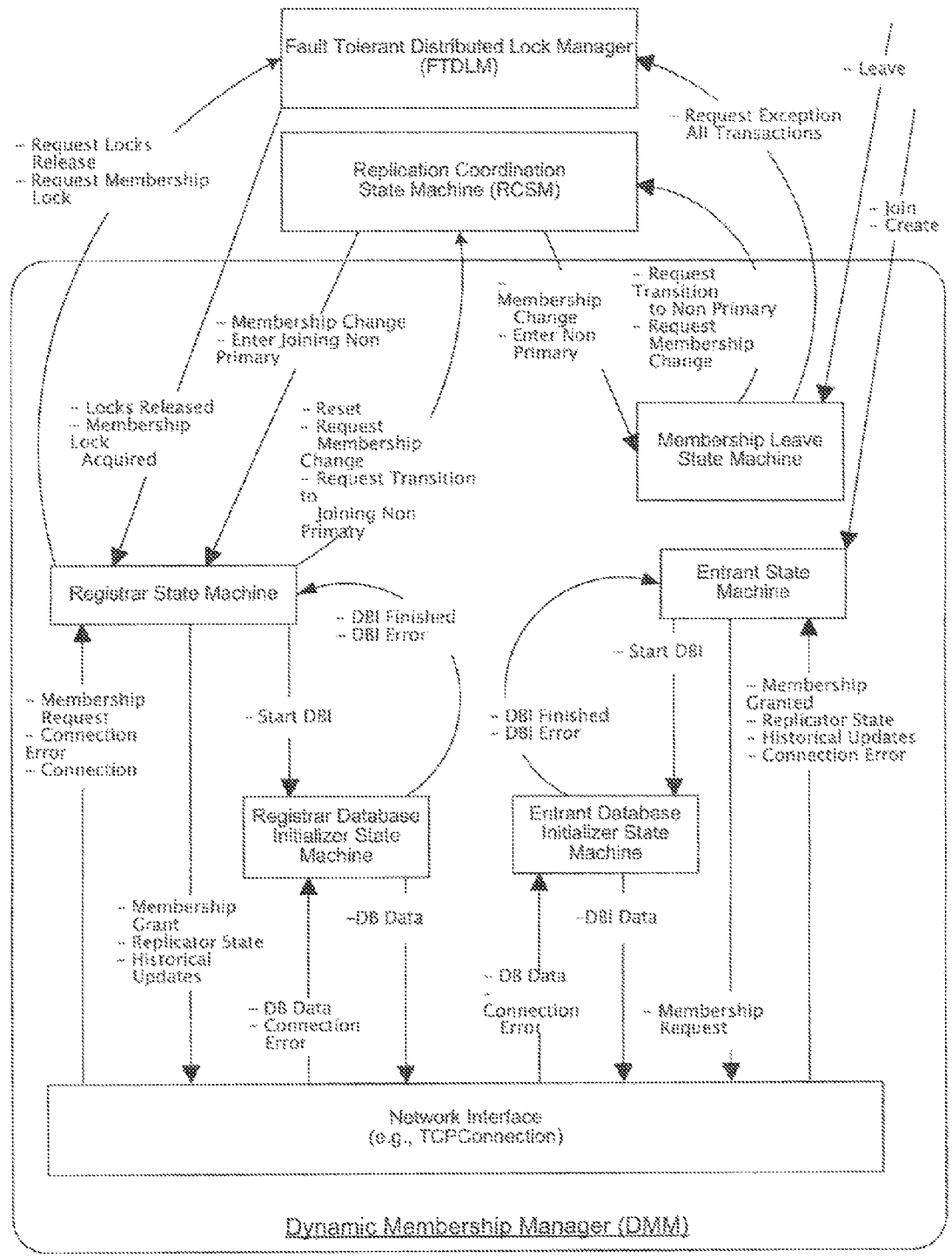
FIG. 2b is a block diagram of a dynamic membership manager shown in FIG. 2a, further illustrating data flow between the dynamic membership manager and other components of the replicator module shown in FIG. 2a, in accordance with an embodiment of the present invention.

FIG. 2b is a block diagram of a dynamic membership manager (DMM) shown in FIG. 2a, configured in accordance with an embodiment of the present invention.

As can be seen, the DMM includes an entrant state machine, a registrar state machine, a registrar database initialization state machine, an entrant database initialization state machine, and a membership leave state machine. A network interface is also provided that allows the DMM to communicate with other sites on the network. FIG. 2b further demonstrates data flow between the DMM and the RCSM and FTDLM, and depicts events that the various modules use to interact with each other to implement DMM functionality.

Prior to discussing each state machine in detail, it may be helpful to identify some general terms and assumptions to facilitate understanding of dynamic membership management. Assume for purposes of this discussion that a server (or other site) includes a replicator module, an instance of the FTDLM, and a replicated database (note, however, that the replicator module can operate without an FTDLM if so desired), A server also has a server ID. Further assume that the replicator module includes durable storage for an action list, an ongoing queue, the Red Cut and Green Lines, and persistent quorum information hereafter referred to as the replicator durable storage or data. Further assume that a persistent membership includes a durable representation of the set of server IDs of servers that are allowed to replicate databases and a group name. Only servers in the persistent membership may replicate databases; two different persistent memberships with different group names must not have any servers in common, in accordance with this particular example. The DMM uses an additional state in the RCSM: Joining Non Primary, which behaves similarly to Non Primary except that the RCSM is instructed to disconnect from the EVS transport and stay disconnected until instructed to reconnect. In Joining Non Primary, the RCSM does not receive view changes; the RCSM stays in Joining Non Primary until the DMM instructs the RCSM to leave Joining Non Primary by reconnecting to the EVS transport. A member is a server that is included in the persistent membership. A member may have failed or recovered. Assume that a member's durable storage includes identifying information for every other member such as member names and server ID. An entrant is a server seeking to become a member. A registrar is a member of the persistent membership which helps the entrant attain membership by modifying the persistent membership on the entrant's behalf and initializing the entrant's database. In the event that the registrar fails, another member of the persistent membership may replace the failed member as registrar for the entrant. A Membership Request message is sent by an entrant to a registrar and includes the entrant's server ID, a name for the entrant, and other administrative information. A Membership Change message is an action which modifies the persistent membership. A Membership Change message behaves like any other action, and is applied in a totally persisted order at all members. A Membership Change message may either add a single server, or remove a single member. A registrar modifies the persistent membership to add the entrant by sending a Membership Change message that adds the entrant to the persistent membership. The registrar and entrant then initialize the entrant's replica. Should the registrar fail, the entrant may reconnect to another member and continue initializing the replica. Techniques by which the replica can be initialized will be discussed in turn. A member may leave the persistent membership by sending a Membership Change message. Likewise, an arbitrary member A may be evicted by another member B if B sends a Membership Change message on behalf of A.

The state machine diagrams shown in FIG. 2b (as well as other state machine diagrams herein) use the following conventions: each box represents a state of the state diagram; each arrow has an Event and an Action labeled with "E:" or "A:" respectively; events trigger the transition as well as the action in the arrow; and events that are not explicitly depicted in the diagrams are either not possible, or are ignored. Additional details of each state machine are further discussed with reference to corresponding FIGS. 3-7.

Of the five state machines included in the DMM of this embodiment, the entrant state machine, the registrar state machine, the entrant database initialization state machine, and the registrar database initialization state machine are directly involved in the membership join protocol. The membership leave state machine is utilized when a member wishes to voluntarily leave the persistent membership. Note, however, that an evicted member does not use the membership leave state machine. The registrar and entrant state machines handle the mechanics of adding the entrant to the persistent membership and populating the entrant's replicator durable storage. The registrar and entrant database initialization state machines are concerned specifically with the initialization of the entrant's database.

The network interface of this embodiment (TCPConnection) is a TCP/IP network interface, although any network interface distinct from the EVS transport is suitable.

FIG. 2b is best explained in terms of operational tasks. Arrows denote data and control flow. The DMM has three primary tasks: acting as a registrar, acting as an entrant, and removing the local member from the persistent membership. When the DMM is acting as a registrar, the registrar state machine receives incoming Connections and Membership Requests from the network interface. Upon receipt of such requests, the registrar state machine Requests a Membership Lock of the FTDLM, which reports that the Membership Lock is Acquired when it has obtained a lock on the entrant's name. The registrar state machine then Requests a Membership Change of the RCSM, which reports the Membership Change when the request has been marked Green and the membership has changed. Then the registrar state machine asks the FTDLM to release locks by Requesting Locks Release. When Locks are Released by the FTDLM, the registrar state machine then Requests Transition to Joining Non Primary of the RCSM. When the RCSM has Entered Joining Non Primary, the registrar state machine knows that the replicated database will stay constant, so the registrar state machine sends a Membership Grant to the entrant state machine (via the network interface) and Starts DBI (Database Initialization) by engaging the registrar database initialization state machine. When DBI is Finished (as indicated by the registrar database initialization state machine), the registrar state machine sends Historical Updates and Replicator State to the entrant state machine, and then Resets.

When the DMM receives a Join request, it constructs or otherwise creates an entrant state machine. The entrant state machine sends a Membership Request to the registrar state machine (via the network interface). Upon receipt of a Membership Grant, the entrant state machine Starts DBI to initialize the entrant database (by engaging the entrant database initialization state machine). When DBI is Finished, the entrant state machine receives Historical Updates and Replicator State from the registrar state machine (via the network interface). Upon installation of replicator persistent state, the entrant state machine constructs the RCSM and joins the EVS transport group.

When the DMM receives a request to Leave the persistent membership, the DMM constructs a membership leave state machine, which first Requests Exception to all Transactions of the FTDLM, and then Requests a Membership Change of the RCSM. When the Membership Change occurs (as indicated by the RCSM), the membership leave state machine Requests Transition to Non Primary of the RCSM. Upon Entering Non Primary (as indicated by the RCSM), the membership leave state machine is complete; the RCSM is halted and the FTDLM stops processing. In addition, the membership leave state machine instructs the RCSM to disconnect from the EVS transport, thereby preventing the RCSM from receiving view changes and leaving Non Primary.

Registrar State Machine

Figure 3:
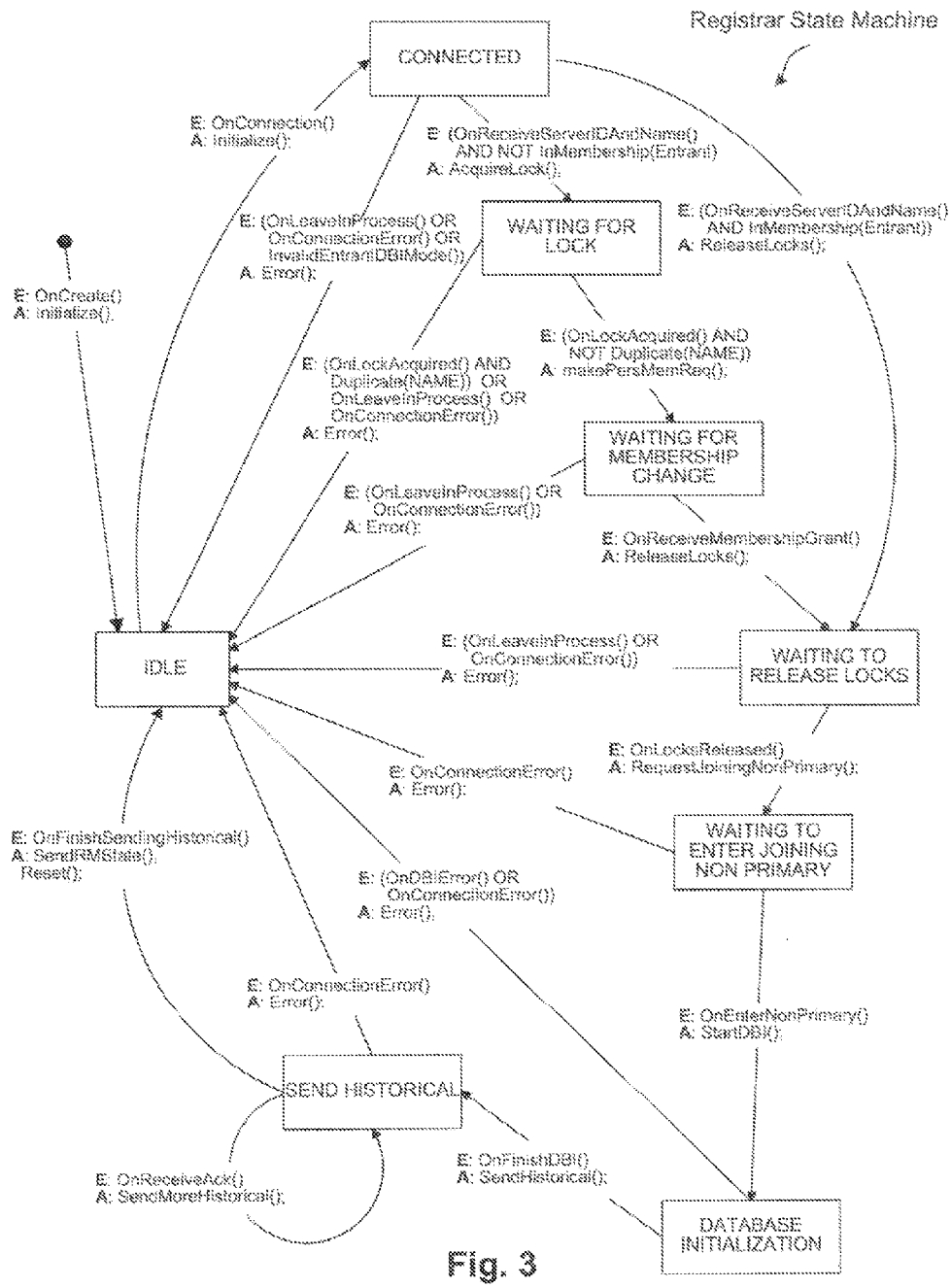
FIG. 3 illustrates a registrar state machine of the dynamic membership manager shown in FIGS. 2a and 2b, configured in accordance with an embodiment of the present invention.

FIG. 3 illustrates a registrar state machine of the dynamic membership manager shown in FIGS. 2a and 2b, configured in accordance with an embodiment of the present invention.

The purpose of the registrar state machine is to help entrants become members. For servers which are already members, the registrar state machine is created upon initialization of the replicator module. For servers which have just become members (either by following the membership join protocol or by starting a new coordination group), the registrar state machine is created upon entering forward processing. In the tatter case of starting a new coordination group, the creation of the registrar state machine is delayed until the replicator module has brought the replicated database and the persistent membership up to date.

The state definitions of the registrar state machine in this example embodiment are as follows:

IDLE: The registrar state machine is waiting for an entrant to connect.

CONNECTED: The registrar state machine is connected to an entrant, but has not received the entrant's server ID or name.

WAITING FOR LOCK: The registrar state machine is waiting for the membership lock (see also AcquireLock function definition).

WAITING FOR MEMBERSHIP CHANGE: The registrar state machine is waiting for the membership change to be given a totally persisted order and applied to the persistent membership.

WAITING TO RELEASE LOCKS: The registrar state machine is waiting for the FTDLM to release locks.

WAITING TO ENTER JOINING NON PRIMARY: The registrar state machine is waiting for the replicator module to enter Joining Non Primary.

DATABASE INITIALIZATION: The registrar database Initialization state machine operates in this state. Operation of the registrar state machine is suspended while the registrar database initialization state machine is processing, and resumes once the registrar database initialization state machine has completed operation.

SEND HISTORICAL: In this state, the registrar state machine is sending historical updates (see also the HistoricalUpdates function definition).

The event definitions of the registrar state machine in this example embodiment are as follows:

OnConnection: This event is signaled when an entrant makes a connection to the registrar state machine.

OnReceiveServerIDAndName: This event occurs when the registrar state machine receives the server ID, name, and weight of the entrant.

OnCreate: This is the initial event, and indicates that the registrar state machine has been created.

OnConnectionError: This event is signaled when either the entrant has sent an error message, or the connection to the entrant has been lost.

OnLockAcquired: This event is signaled when the member name lock has been acquired.

OnReceiveMembershipGrant: This event is signaled when the Membership Change Message has been assigned a total persisted order, persistently stored, and the Persistent Membership has changed.

OnLeaveInProcess: This event is signaled when the FIDLM leaves forward processing.

OnLocksReleased: This event is signaled when the FTDLM has sent all changes and released all locks.

OnEnterNonPrimary: This event is signaled when the replicator module has entered Joining Non Primary. Joining Non Primary is a regular Non Primary state, except that EVS transport changes do not change the replicator module state.

OnFinishDBI: This event is sent by the registrar database initialization state machine indicating successful completion.

OnDBIError: This event is sent by the registrar database initialization state machine indicating unsuccessful completion.

OnReceiveAck: This event is signaled when the Entrant has sent an acknowledgement during the historical update protocol.

OnFinishSendingHistorical: This event is signaled when historical updates are sent.

The function definitions of the registrar state machine in this example embodiment are as follows:

Initialize( ): Initialization is comprised of initializing the network connection and starting to listen for entrant requests.

Reset( ): Reset destroys any memory of the last entrant's information. If the registrar state machine requested that the replicator module leave Primary and enter Joining Non Primary, then Reset instructs the replicator module to reenter Primary. The replicator module does this by reconnecting to the EVS transport.

Error( ): If the error is caused by the entrant state machine (via an OnConnectionError event), then Error just calls Reset. If any other error occurred, Error sends an error message to the entrant state machine and then calls Reset.

AcquireLock( ): This function instructs the FIDLM to acquire the lock named GroupName:MemberName, where GroupName denotes the name of the group that the registrar state machine is part of, and MemberName denotes the name sent by the entrant state machine.

ReleaseLocks( ): This function requests that the FTDLM release all current locks. The FTDLM exceptions all transactions in process, causes the RCSM to send all accumulated unpropagated updates, and sends lock release messages.

makePersMemReq( ): This function requests that the replicator module send a Membership Change message adding the entrant to the membership. The message is sent over the EVS transport, thereby propagating the (logical) update to the persistent membership.

RequestJoiningNonPrimary( ): This function requests that the replicator module enter Joining Non Primary.

StartDBI: This function sends an event to the registrar database initialization state machine indicating that it can proceed. This function also suspends operation of the registrar state machine until the registrar database initialization state machine has finished operating.

SendHistorical: This function sends historical updates. The registrar state machine sends a subset of the updates that have been assigned a totally persisted order. The first update that the registrar state machine sends is determined by the database initialization mode of the entrant state machine. If the entrant state machine has requested backup/historical initialization mode, then the first update the entrant state machine does not have becomes the first update the registrar state machine sends; elsewise the registrar state machine sends its entire historical update list. The registrar state machine and entrant state machine implement a flow control system based on size of updates: when the size of accumulated sent updates exceeds a certain (e.g., configurable) limit, the registrar state machine sends an acknowledgement request and waits for an OnReceiveAck event.

SendMoreHistorical: Upon receipt of an acknowledgement from the entrant state machine, the registrar state machine continues sending more historical updates, picking up where it left off.

SendRMState: This function causes the registrar state machine to send its current persistent replicator module state, including the persistent membership. The sent Red Cut is set to be a duplicate of the sent Green Lines, since only totally persisted updates are sent to the entrant state machine.

InMembership(Entrant): This function returns true if the entrant's server ID is in the active persistent membership; otherwise, this function returns false.

Duplicate(Name): This function returns true if the entrant's name is already in use in the active or inactive persistent membership; otherwise, this function returns false.

InvalidEntrantDBIMode( ): This function returns true if the entrant state machine has requested backup/historical mode and the last applied update in the entrant's database is not found in the registrar's historical update list.

This particular embodiment of the registrar state machine includes use of the fault tolerant distributed lock manager (FTDLM) in order to ensure uniqueness of server names within the persistent membership. The registrar state machine and dynamic membership manager (DMM) in general may be utilized in the absence of the FTDLM by omitting states WAITING TO RELEASE LOCKS and WAITING FOR LOCK, if so desired. Note, however, that in the event that these states are omitted, the WAITING FOR MEMBERSHIP CHANGE state still exists, as this state is necessary in order to initialize the entrant's database after the entrant has been added to the persistent membership.

Entrant Database initialization State Machine

Figure 4:
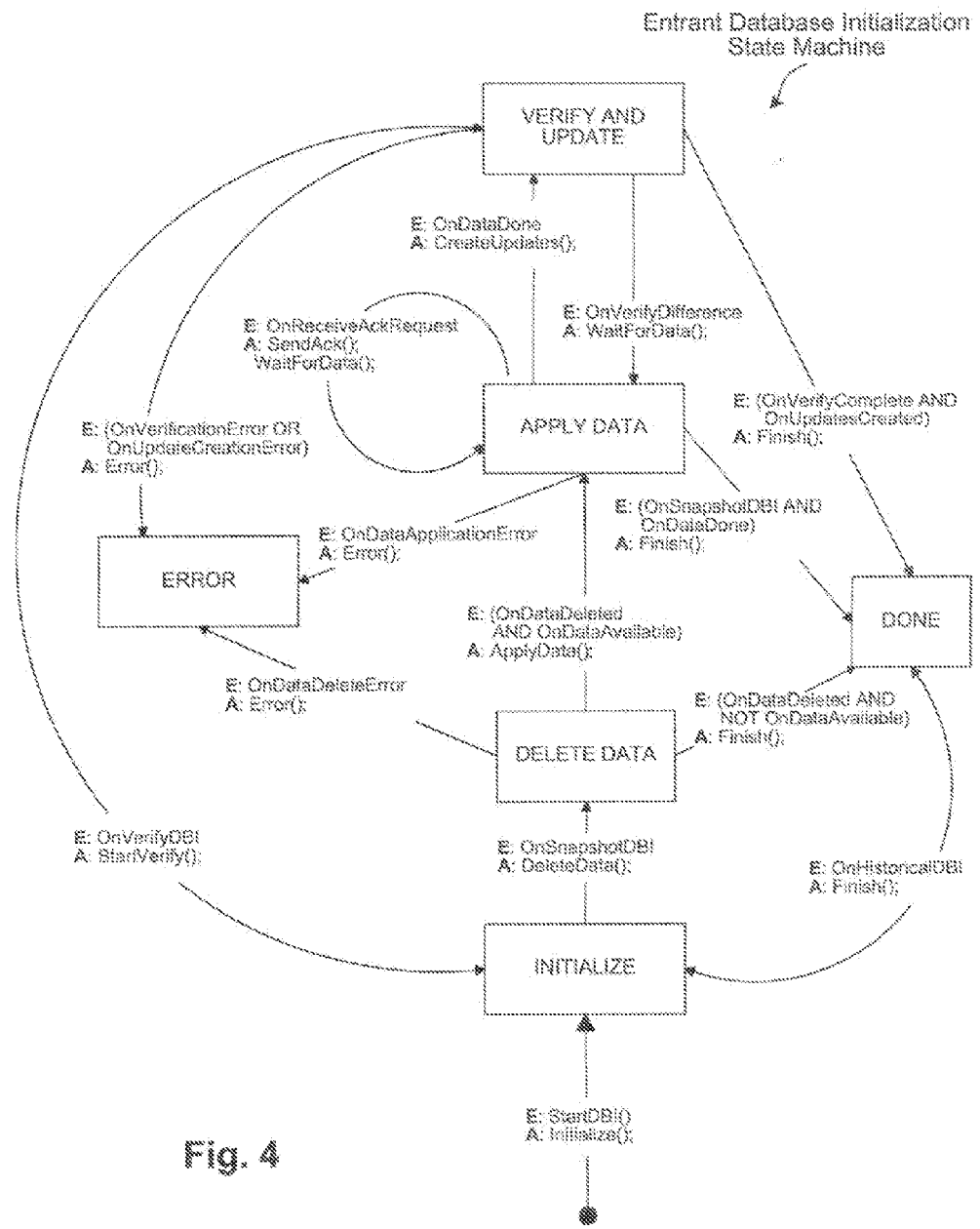
FIG. 4 illustrates an entrant database initialization state machine of the dynamic membership manager shown in FIGS. 2a and 2b, configured in accordance with an embodiment of the present invention.

FIG. 4 illustrates an entrant database initialization state machine of the dynamic membership manager shown in FIGS. 2a and 2b, configured in accordance with an embodiment of the present invention.

The entrant database initialization state machine operates when the entrant state machine is in the database initialization state. The purpose of the entrant database initialization state machine is to initialize the entrant's replicated database. If entrant initialization is in verification/update mode, then an additional role for database initialization is to create the necessary updates in the entrant's action buffer that would introduce data only on the entrant's database to the rest of the replication group. These updates are created as Red actions; upon joining the EVS transport group, the replicator modules of all connected members will apply these updates and thus make the entrant's new data available. Members not connected at the time the entrant joins the EVS transport group will eventually receive these updates in the normal manner during recovery.

When in snapshot or update/verify mode, processing of the entrant database occurs by partitioning the database and processing each partition in turn. These partitions can be the same as those utilized by the FTDLM as locks, but do not have to be. Any suitable partitioning method can be used as long as both the registrar and entrant state machines use the same method.

As with the processing of historical updates, the registrar and entrant database initialization state machines implement flow control in order to avoid dropped connections due to buffer overflow. Entrant tasks during database initialization can be time consuming, and if the registrar is allowed to send data without flow control the registrar can easily overflow network buffers while the entrant will be busy with database access. Network buffer overflow may result in connection errors, which may in turn cause other events (e.g., the registrar state machine, the entrant state machine, the registrar database initialization state machine, and the entrant database initialization state machine to restart).

As will be apparent in light of this disclosure, the entrant database initialization state machine can be implemented as multiple state machines (e.g., one for each database initialization mode). However, because of functional overlap and for brevity, the functionality has been collapsed into a single state machine.

The state definitions of the entrant database initialization state machine in this example embodiment are as follows:

INITIALIZE: In the IN state, the entrant database initialization state machine determines the mode of database initialization to perform, acquires database connections, and other such initialization functionality.

DELETE DATA: In the DELETE DATA state, the entrant database initialization state machine deletes all existing data in the replicated database.

APPLY DATA: In the APPLY DATA state, the entrant database initialization state machine applies data sent from the registrar database initialization state machine to the replicated database. If the database was emptied via DELETE data, then application includes creating or inserting new data. If the database was not emptied, then application may include updating existing data or creating new data.

VERIFY AND UPDATE: in the VERIFY AND UPDATE state, the entrant database initialization state machine verifies data partitions in turn. If a data partition is determined to contain different data than the registrar's copy, then the registrar database initialization state machine sends any missing or different data, which the entrant database initialization state machine then applies in the APPLY DATA state. If after application of data from the registrar database initialization state machine, data partitions still contain differences, the data that exists only on the entrant's replicated database is turned into updates in the entrant's action buffer with the CreateUpdates function (which will be discussed in turn).

ERROR: The ERROR state signifies that some error occurred during database initialization. When the entrant database initialization state machine enters the Error state, the entrant state machine is sent an OnDBIError event (as will be discussed with reference to FIG. 6).

DONE: The DONE state is the final state of the entrant database initialization state machine. When the entrant database initialization state machine enters the DONE state, the entrant state machine is sent an OnDBIFinished event (as will be discussed with reference to FIG. 6).

The event definitions of the entrant database initialization state machine in this example embodiment are as follows:

StartDBI: This event is sent by the entrant state machine when it moves to the DATABASE INITIALIZATION state.

OnSnapshotdDBI: This is a pseudo event, which returns true when the entrant database initialization state machine is in snapshot initialization mode.

OnHistoricalDBI: This is a pseudo event, which returns true when the entrant database initialization state machine is in backup/historical initialization mode. In this mode, the entrant database initialization state machine does nothing.

OnVerifyDBI: This is a pseudo event, which returns true when the entrant database initialization state machine is in verify/update mode.

OnDataDeleted: This event signifies that all data in the entrant's replicated database has been deleted.

OnDataDeleteError: This event signifies that not all data in the entrant's replicated database could be deleted.

OnDataApplicationError: if the entrant is in snapshot mode, this event signifies that not all data could be inserted into the entrant's replicated database. If the entrant database initialization state machine is in update/verify mode, then this event signifies that not all data could be updated or inserted into the entrant's replicated database.

OnDataAvailable: This event signifies that the entrant database initialization state machine has received data from the registrar database initialization state machine.

OnDataDone: When the registrar database initialization state machine has finished sending data, this event is signaled.

OnVerificationError: When the entrant database initialization state machine detects an unrecoverable verification error, this event is signaled. An unrecoverable verification error may occur, for example, when the entrant database initialization state machine is unable to reconcile differences (e.g., by applying inserts, updates, or creating historical updates) between the registrar's replicated database and the entrant's replicated database.

OnUpdateCreationError: This event is signaled when the entrant database initialization state machine cannot create the necessary updates to propagate data that is new on the entrant's replicated database.

OnReceiveAckRequest: This event signifies that the registrar database initialization state machine sent an acknowledgement request.

OnVerifyDifference: This event is signaled when the entrant database initialization state machine detects differences in the entrant's and registrar's replicated databases.

OnVerifyCompleted: This event is signaled when verification is complete.

OnUpdatesCreated: This event is signaled when creation of updates is complete.

The function definitions of the entrant database initialization state machine in this example embodiment are as follows:

Initialize: The initialize function determines which mode database initialization is in. If in snapshot mode, then dependencies between data partitions are computed and initialization occurs in dependency order.

Finish: The Finish function signals the entrant state machine that database initialization was successful.

DeleteData: The DeleteData function deletes existing data from the entrant's replicated database in reverse dependency order.

StartVerify: The StartVerify function initializes the verification of data partitions. Verification occurs in any method which ensures that the data in the registrar and entrant databases for a specific partition is identical. This can occur, for example, via checksumming or direct comparison. Each data partition is verified in turn.

Error: When an error is detected, the entrant database initialization state machine sends a DBIError event to the entrant state machine. The Entrant database initialization state machine also sends an error to the registrar database initialization state machine.

SendAck: This function sends an acknowledgement to the registrar database initialization state machine.

WaitForData: This function sends a data request to the registrar database initialization state machine and waits for a response.

ApplyData: This function alters the entrant's replicated database by some combination of inserting data and updating existing data. Data from the registrar database initialization state machine may be inserted into the entrant's replicated database, and data in the entrant's database may be updated to be identical to that in the registrar's replicated database.

CreateUpdates: When verification is complete the entrant determines which data partitions in the entrant's replicated database contain data that the registrar's replicated database does not contain. The data in these data partitions is then used to create update actions which are marked Red. These actions consist of the necessary inserts to populate a replicated database such that upon reconciliation of the actions the replicated database contains the same data as that in the entrant's replicated database.

Registrar Database Initialization State Machine

Figure 5:
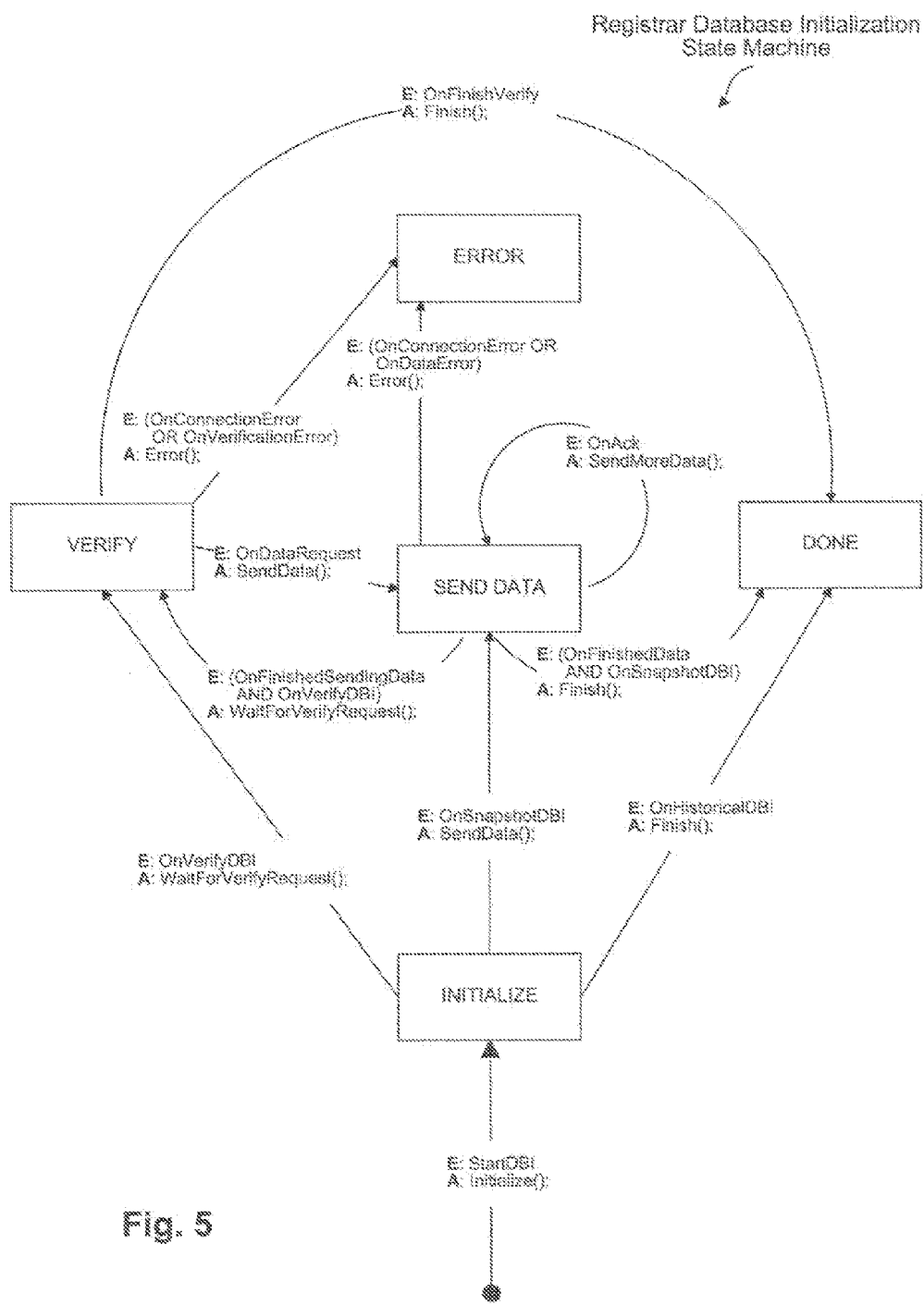
FIG. 5 illustrates a registrar database initialization state machine of the dynamic membership manager shown in FIGS. 2a and 2b, configured in accordance with an embodiment of the present invention.

FIG. 5 illustrates a registrar database initialization state machine of the dynamic membership manager shown in FIGS. 2a and 2b, configured in accordance with an embodiment of the present invention.

The registrar and entrant database initialization state machines can be thought of as two cooperating state machines, in that each operates with the help of the other. Whereas the entrant database initialization state machine is bringing the entrant's replicated database up to date, the registrar database initialization state machine is simply providing data from its replicated database, which is, by definition, already up to date.

As with the entrant database initialization state machines, the registrar database initialization state machine utilizes flow control to ensure that the registrar database initialization state machine does not send data more quickly than the entrant state machine can process it. When the entrant database initialization state machine requests data for a data partition, it may not know how large that partition is; therefore the registrar database initialization state machine sends some data and then initiates an acknowledgement request cycle. When the entrant database initialization state machine acknowledges the data, the registrar database initialization state machine continues sending data.

The registrar database initialization state machine partitions the database in the same manner as the entrant database initialization state machine. As with the entrant database initialization state machine, one logical state machine can be implemented for each entrant database initialization mode (of which there are three; others will be apparent in light of this disclosure). However, these three state machines have been collapsed into one state machine as shown in FIG. 5 due to functional overlap and brevity.

The state definitions of the registrar database initialization state machine in this example embodiment are as follows:

INITIALIZE: In the INITIALIZE state, the entrant's database initialization mode is determined, data partitions are determined, database connections are obtained, and any other necessary initialization occurs.

SEND DATA: When in SEND DATA state, the registrar database initialization state machine is extracting data from a data partition in the registrar's replicated database and sending it to the entrant database initialization state machine.

VERIFY: In VERIFY mode, the registrar database initialization state machine is aiding the entrant database initialization state machine in verification of a particular data partition. In one embodiment, this is carried out via direct comparison between the contents of the registrar's database and the entrant's database.

ERROR: The ERROR state indicates that some failure occurred; either a connection error, a local data access error, or an error on the entrant database initialization state machine.

DONE: The DONE state indicates that database initialization completed successfully.

The event definitions of the registrar database initialization state machine in this example embodiment are as follows:

StartDBI: This event is sent by the registrar state machine when database initialization should take place.

OnSnapshotDBI: This is a pseudo event, which returns true when the entrant database initialization state machine is in snapshot initialization mode.

OnHistoricalDBI: This is a pseudo event, which returns true when the entrant database initialization state machine is in backup/historical initialization mode. In this mode, the registrar database initialization state machine does nothing.

OnVerifyDBI: This is pseudo event, which returns true when the entrant database initialization state machine is in verify/update mode.

OnFinishedSendingData: This event is signaled when the registrar database initialization state machine has sent all the data corresponding to a specific request.

OnFinishedData: This event is signaled when the registrar database initialization state machine has no more data to send.

OnConnectionError: This event signifies that some sort of network error occurred, or that the entrant database initialization state machine sent an error message other than a verification error message.

OnDataError: This event is signaled when the registrar database initialization state machine cannot obtain data for a particular data partition for which data exists from the database.

OnAck: This event is signaled when the registrar database initialization state machine receives an acknowledgement from the entrant database initialization state machine.

OnVerificationError: This event is signaled upon receipt of a message indicating that the entrant database initialization state machine has determined that verification has failed.

OnFinishVerify: This event is signaled upon receipt of a message indicating that the entrant database initialization state machine has finished verification.

OnDataRequest: This event is signaled upon receipt of a request for data for a particular partition from the entrant database initialization state machine.

The function definitions of the registrar database initialization state machine in this example embodiment are as follows.

Initialize: The initialize function initializes the registrar database initialization state machine, acquires database connections, ensures that the database can be read, and other such initialization functionality.

SendData: The SendData function sends the data contained in the requested data partition. If the data partition contains more data than can be sent without an acknowledgement request, then the SendData function follows the data with an acknowledgement request.

SendMoreData: Upon receipt of an acknowledgement, the SendMoreData function continues sending data from the current data partition.

Finish: When there is no more data to send, and the entrant database initialization state machine signals that verification or snapshotting was successful, the Finish function sends a DBIFinished event to the registrar state machine.

WaitforVerifyRequest: Verification occurs by data partition in turn. The entrant database initialization state machine verifies the first partition, and the second and so on. Verification of each data partition results in a request for data. The WaitForVerifyRequest function waits for such requests.

Error: The Error function signals that verification failed by sending a DBIError event to the registrar state machine.

Entrant State Machine

Figure 6:
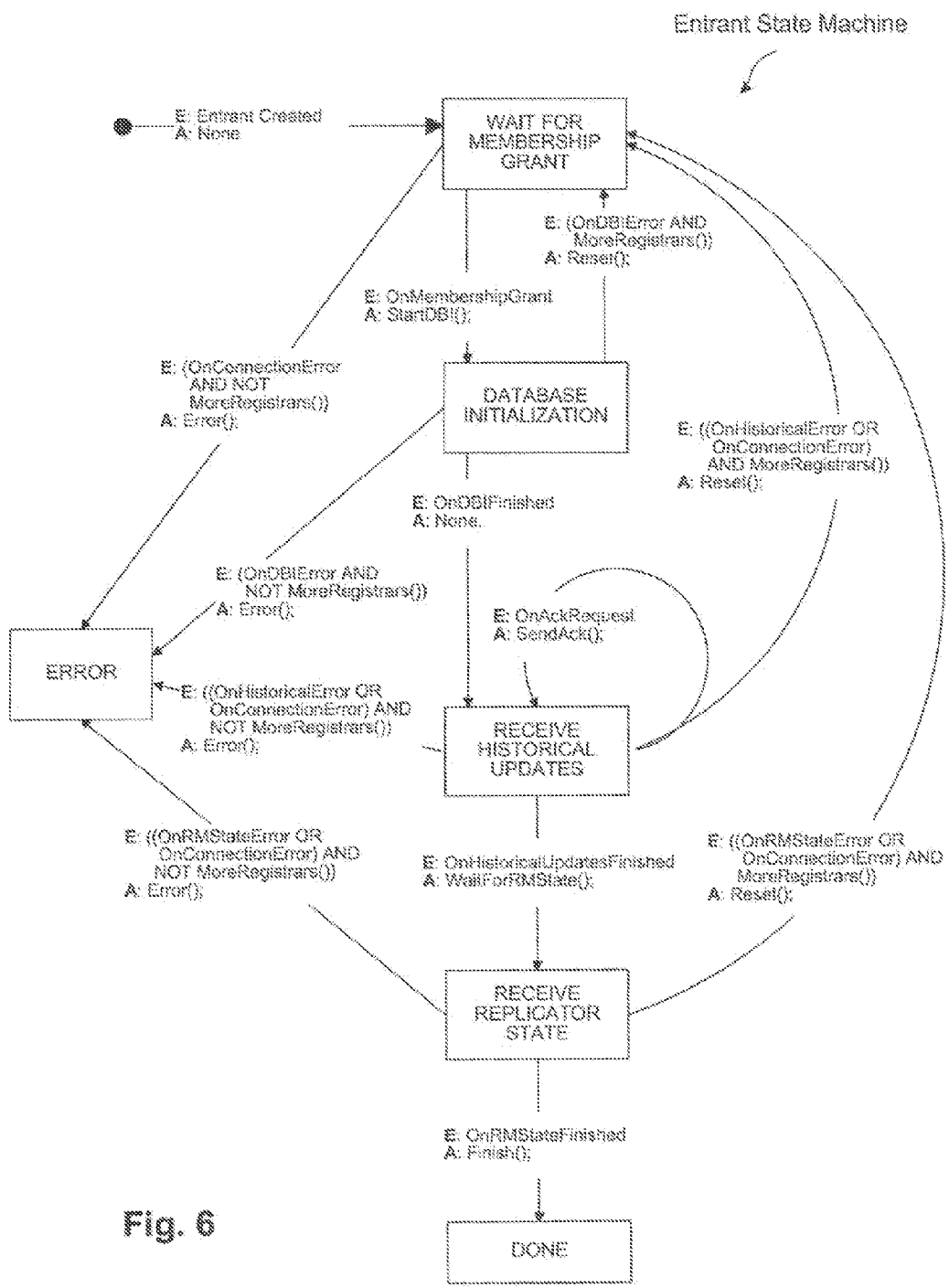
FIG. 6 illustrates an entrant state machine of the dynamic membership manager shown in FIGS. 2a and 2b, configured in accordance with an embodiment of the present invention.

FIG. 6 illustrates an entrant state machine of the dynamic membership manager shown in FIGS. 2a and 2b, configured in accordance with an embodiment of the present invention.

The purpose of the entrant state machine is primarily to receive data in a specified order from the registrar state machine. The entrant state machine commences upon a client request to join the persistent membership. When the entrant's request to join has been granted, the entrant state machine and registrar state machine arrange for the database initialization protocol to operate. This causes the registrar database initialization state machine and entrant database initialization state machine to operate. When database initialization is complete, the registrar state machine sends any historical updates that the entrant state machine does not have in total persisted order, and the entrant state machine stores those updates in its action list, optionally applying them if in backup/historical mode. Finally, the registrar state machine sends a modified copy of the registrar's replicator module persistent state. This copy is identical to that stored on the registrar state machine except for the Red Cut, which is set to be a duplicate of the Green Lines since the entrant state machine does not have any Red actions. Of course, if the entrant state machine created Red actions as part of database initialization, the Red Cut for those actions is preserved.

An entrant state machine may use more than one registrar state machine if the membership join protocol thus in some way. The entrant state machine keeps a transient list of available registrars; as each attempt fails the entrant state machine determines whether to remove the current registrar from the list; then the entrant state machine tries the next registrar. When the entrant state machine reaches the end of the registrar list, it starts at the beginning again. If there are no available registrars, then the membership join protocol fails.

The state definitions of the entrant state machine in this example embodiment are as follows.

WAIT FOR MEMBERSHIP GRANT: In this state, the entrant state machine has sent a Membership Request message to the current registrar state machine and is waiting for a grant.

DATABASE INITIALIZATION: The entrant state machine is in this state when the entrant database initialization state machine is operating.

RECEIVE HISTORICAL UPDATES: The entrant state machine is receiving historical updates. If the entrant database initialization state machine is in backup/historical mode, the entrant state machine is also applying these updates.

RECEIVE REPLICATOR STATE: The entrant state machine is receiving the persistent replicator module's state.

ERROR: When the entrant state machine runs out of registrars, it enters the Error state. No further processing occurs.

DONE: When the entrant state machine has successfully completed, it enters the DONE state. Upon entering the DONE state, the replicator module and fault tolerant distributed lock manager (FTDLM) are created.

The event definitions of the entrant state machine in this example embodiment are as follows.

EntrantCreated: This event is signaled when the DMM receives a request to join the persistent membership from a client. The DMM does not initiate the join until a client specifically requests that this server become a member and presents a list of registrars.

OnMembershipGrant: This event is signaled when the entrant state machine receives a Membership Grant message from the registrar state machine.

OnDBIError: This event is sent by the entrant database initializer state machine when it encounters an error.

OnDBIFinished: This event is sent by the entrant database initializer state machine when it finishes successfully.

OnAckRequest: This event is signaled when the entrant state machine receives an acknowledgement request from the registrar state machine during reception of historical updates.

OnHistoricalUpdatesFinished: This event is signaled when the entrant state machine has populated the action list and applied all updates if in backup/historical mode.

OnHistoricalError: This event is signaled when the entrant state machine is either unable to populate the action list with historical updates, or is unable to apply those historical updates if in backup/historical mode.

OnRMStateFinished: This event is signaled when the entrant state machine has installed the persistent replicator module state.

OnRMStateError: This event is signaled when the entrant state machine cannot install the persistent replicator module state.

OnConnectionError: This event is signaled when the connection to the registrar state machine is dropped, or when the entrant state machine receives an error message from the registrar state machine.

The function definitions of the entrant state machine in this example embodiment are as follows.

MoreRegistrars: The entrant state machine keeps a transient list of available registrars. This function returns true when this list is not empty.

Reset: This function is called upon error. Depending on the type of error, the current Registrar may be removed from the list of available registrars. Then, the entrant state machine sends a Membership Request message to the next available registrar state machine.

StartDBI: This function starts the entrant database initializer state machine.

SendAck: This function sends an acknowledgement to the registrar state machine when the entrant state machine receives an acknowledgement request.

Error: This function signals an error to the dynamic membership manager, signifying that the membership join protocol failed.

Finish: The Finish function signals success to the entrant state machine's caller, signifying that the membership join protocol succeeded.

WaitForRMState: This function waits until the registrar state machine sends the replicator module's persistent state.

Membership Leave State Machine

Figure 7:
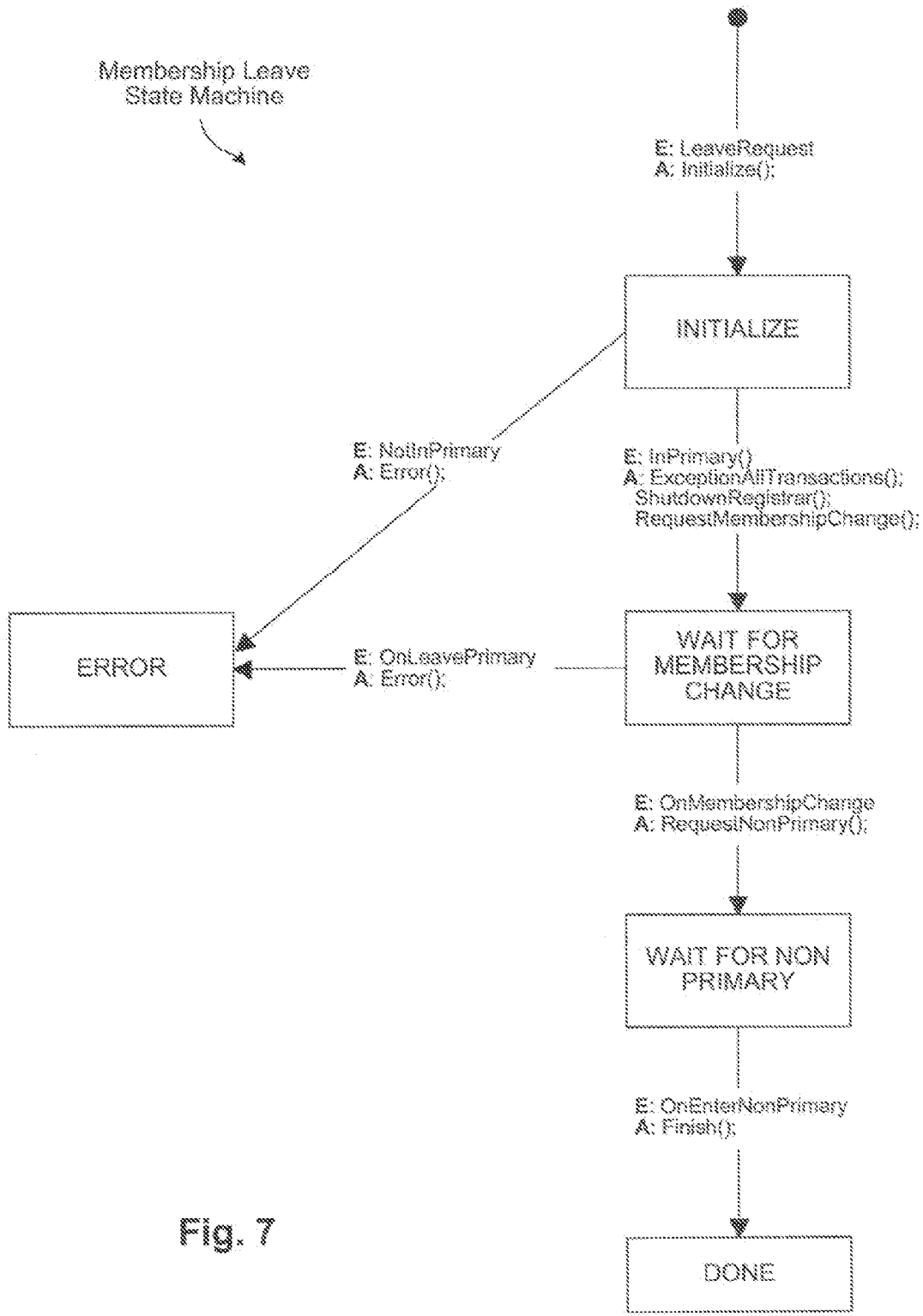
FIG. 7 illustrates a membership leave state machine of the dynamic membership manager shown in FIGS. 2a and 2b, configured in accordance with an embodiment of the present invention.

FIG. 7 illustrates a membership leave state machine of the dynamic membership manager shown in FIGS. 2a and 2b, configured in accordance with an embodiment of the present invention.

The purpose of the membership leave state machine is to coordinate the shutdown of various components upon voluntary leave. The membership leave state machine is only used during voluntary leave, which can only be initiated via client request.

The state definitions of the membership leave state machine in this example embodiment are as follows.

INITIALIZE: The INITIALIZE state determines whether this member can process a Leave request.

ERROR: When the ERROR state is reached, an exception is thrown.

WAIT FOR MEMBERSHIP CHANGE: In this state the membership leave state machine is waiting for the Membership Change message containing the Leave for this member to be marked Green.

WAIT FOR NON PRIMARY: In this state the membership leave state machine is waiting for the RCSM to enter non primary.

DONE: When the DONE state is reached, the persistent replicator state has been set such that upon process failure the member will continue to not be a member.

The event definitions of the membership leave state machine in this example embodiment are as follows.

LeaveRequest: A LeaveRequest event is signaled by the DMM and notifies the membership leave state machine that the client wishes this member to leave the membership.

InPrimary: This is a pseudo-event, that returns true when the RCSM is in REGULAR PRIMARY and the FTDLM is forward processing.

NotInPrimary: This is a pseudo-event, that returns true when the RCSM is not in REGULAR PRIMARY and the FTDLM is not forward processing.

OnLeavePrimary: This event is signaled when the RCSM leaves Regular Primary.

OnMembershipChange: This event is signaled when the RCSM marks a Membership Change message Green and modifies the persistent membership.

OnEnterNonPrimary: This event is signaled when the RCSM enters NON PRIMARY.

The function definitions of the membership leave state machine in this example embodiment are as follows.

Initialize: The Initialize function determines whether the Leave request can proceed.

Error: The Error function notifies the client that the Leave failed.

Finish: The Finish function sets the persistent membership state to be not in the persistent membership.

ExceptionAllTransactions: The ExceptionAllTransactions function requests the FTDLM to exception all in process transactions.

ShutdownRegistrar: If this member is configured to act as a registrar, then this function halts the registrar state machine so that it no longer accepts incoming connections.

RequestMembershipChange: This function requests the RCSM to send a Membership Change message requesting that this member leave the persistent membership.

RequestNonPrimary: This function requests the RCSM to enter NON PRIMARY by disconnecting from the EVS transport.

Membership Join Protocol and Methodology

As will be appreciated in light of this disclosure, membership join is the process by which an entrant becomes a member. The process includes modifying the persistent membership to include the new member, initializing the entrant's replica, initializing administrative data, and initializing the entrant's replicator durable storage. In addition to a server ID, each member also has a name (e.g., human readable shorthand), in accordance with one particular embodiment of the present invention. When a registrar receives a Membership Request message from an entrant, that registrar determines: (a) whether any other member has the same name, and (b) whether some other entrant is attempting to attain membership using the same name. In order to achieve this, the registrar employs the FTDLM to acquire a distributed lock on the entrant's name. Upon acquisition of this lock, the registrar verifies that no other member has the entrant's name.

If this is not the case, the entrant is refused membership. In the event that the entrant is already part of the persistent membership, the registrar does not add the entrant again. Upon modification of the persistent membership, the registrar and entrant can initialize the entrant's database.

The replicator module described herein utilizes the services of a group communication system (GCS) which provides an Extended Virtual Synchrony (EVS) service. The GCS manages transport between a set of servers that are currently communicating with each other. Entrance into this set of servers is determined by a connection protocol, which forces view changes. The replicator module performs recovery upon view changes, which is computationally expensive. In order to avoid view changes, the membership join protocol does not utilize the GCS; instead the registrar and entrant communicate via TCP/IP connection, although any suitable network protocol may be utilized. Note that the registrar and entrant utilize a different communication system from the replicator module so as not to create unnecessary view changes, which result in the coordination group leaving forward processing and thereby decreases availability. Further note the distinction between a coordination group (which includes sites replicating databases) and a GCS group (which includes servers communicating, but not necessarily part of the same coordination group). For instance, a coordination group could include servers A. B. C and D. Suppose a new server, E, connects to the EVS transport. E is now part of the GCS group. This produces a view change, and the new view includes A, B, C, D, and E. However, E is not part of the coordination group, as it is not in the persistent membership. Thus, all the servers can all talk to each other, but E does no replication and does not send updates. Note the inherent security feature here, in that updates attempted by malicious users that hack into the GCS group will be ignored by the members of the coordination group, because the malicious user is not part of the persistent membership. Additional security mechanisms can be implemented to prevent malicious access at the GCS group level as well, if so desired (e.g., intrusion detection systems).

As previously referred to in the description of the state machines, there are three methods for database initialization: snapshot, verify/update, and backup/historical. In the snapshot method, the entrant database is initialized via standard database snapshotting. In the verify/update method, the contents of the registrar's and entrant's databases are compared, and any inconsistencies are rectified. In the backup/historical initialization mode, the database is brought up to date from an offline copy by applying historical updates. In order to provide a consistent snapshot of the replica, the registrar voluntarily disconnects from the group communication system. This forces the FTDLM to inhibit all further updates, thereby providing a consistent snapshot.

Alternatively, database initialization could occur without the registrar disconnecting from the GCS if the registrar disallowed forward processing and acquired distributed locks on partitions of the database in turn. However, this may reduce the availability of the replication network. In particular, if the partitions are too small, this increases lock message traffic which burdens all servers. On the other hand, if the partitions are too large then contention will occur. Rather than impede the entire replication group, one choice is to only have the registrar disconnect.

The Membership Join Protocol configured in accordance with one embodiment of the present invention includes the steps 1 through 4 below for a variation thereof), and any one or more of the refinements. Note that some of the refinements are dependent on earlier refinements, while others are independent.

Step 1: The entrant contacts the registrar, which sends a Membership Change message on the entrant's behalf.

Step 2: Once the Membership Change message has been persisted, totally ordered, and the persistent membership has changed, the registrar and entrant initialize the entrant's database.

Step 3: Should the connection between the registrar and the entrant be severed, the entrant can reconnect to any available registrar.

Step 4: The entrant and registrar join the GCS group and recovers.

Refinement 1: The entrant sends a Membership Request message to the registrar. When the entrant wishes to utilize backup/historical initialization, the Membership Request message also contains an action ID of the last action that was applied to the entrant's database. This identifier contains the server ID of the server that generated the update as well as a server relative index. Therefore, the action ID uniquely identifies the containing persistent membership. In the event that the registrar does not contain the historical update for this action ID, the registrar refuses to proceed.

Refinement 2: The registrar acquires a distributed lock on the group and entrant name utilizing the FTDLM. Upon receipt of the distributed lock, the registrar examines the persistent membership to ensure that no other server utilizes the entrant's name. Each server ID is paired with exactly one name. If the entrant's name is already in use by a server other than the entrant, the registrar refuses to proceed. Acquisition of the distributed lock requires forward processing; therefore a registrar can only service an entrant if the registrar has attained quorum.

Refinement 3: If the entrant is not already part of the persistent membership, the registrar sends the Membership Change message containing the entrant's server ID, name, and other identifying information. When the Membership Change message has been marked Green and the persistent membership has been changed, the registrar proceeds.

Refinement 4: The registrar's FTDLM aborts any transactions in process and releases any locks held by the registrar. Locks are released so that other members may utilize the locks, and also so that no unpropagated changes exist in the registrar's replicated database. The registrar then leaves the GCS group. This causes the replicator module and the FTDLM to stop forward processing, which allows the registrar to provide a consistent snapshot to the entrant.

Refinement 5: The registrar and entrant then initialize the entrant's database.

Refinement 5a: If the entrant is using snapshot initialization, the entrant's database is initialized with the contents of the registrar's database. These contents are guaranteed not to change while the entrant and registrar are communicating because the replicator module and FTDLM are not forward processing. Snapshotting occurs by extracting data from the registrar's database and sending it to the entrant, which then adds it to the entrant's database. Before any snapshotting occurs, the entrant deletes all data in its database to ensure a clean copy.

Refinement 5b: If the entrant is using verify/update initialization, the entrant and registrar compare contents of their databases. Any corrupt data in the entrant's database is rectified; missing data is added (i.e., discrepancies are resolved). If the entrant contains new data, the entrant may create actions corresponding to this new data and mark those actions Red.

Refinement 5c: If the entrant is using backup/historical initialization, the registrar sends all Green actions after the last applied action at the entrant to the entrant, which then applies those actions. The registrar does not send the contents of the ongoing queue.

Refinement 6: The registrar then sends Green and White actions and replicator administrative data to the entrant. In the event that the entrant used backup/historical initialization, the historical data is already present and only the replicator administrative data (including Green Lines, Red Cut, persistent quorum information) is sent. Upon receipt of this replicator durable data, the entrant disconnects from the registrar. A flow control protocol is utilized so as not to exceed any network buffers or otherwise cause the network connection between the registrar and the entrant to be dropped. The flow control is based on the size of the actions. Furthermore, the registrar sends a modified version of the registrar's Red Cut to the entrant, namely the Green Lines at the registrar converted to a Red Cut. This version is used because the registrar does not send the contents of the action buffer; therefore the Red Cut on the entrant cannot know of those actions.

Refinement 7: The registrar rejoins the GCS group. The entrant contacts the GCS system.

Refinement 8: The registrar and entrant recover.

Refinement 9: Once the entrant member has attained quorum, it's replicator durable data is up to date. The entrant member may then become a registrar if so configured. Only Members are allowed to become registrars if they have participated in at least one quorum; this ensures that their replicator durable data is at least as up to date as the last known quorum. If the entrant created actions for data that only existed on the entrant, those actions are marked green during recovery in the usual manner.

Membership Leave Methodology

Membership Leave is the process by which a member leaves the persistent membership and becomes a server. Typically, the application of a Membership Change message to the persistent membership results in a member being removed from the persistent membership and the removal of administrative data associated with the member. A number of refinements to this membership leave methodology will now be described.

Voluntary leave: in a voluntary leave, a member sends a Membership Change message which, when applied to the persistent membership, will remove the member from the persistent membership. In accordance with an embodiment of the present invention, prior to sending the Membership Change message, the member's FTDLM must inhibit all in process transactions by causing them to exception. Upon marking the Membership Change message Green, the member can leave the GCS, which forces a view change causing the server to stop forward processing. The server is not allowed to modify the replicator durable data upon leave in the event that the server is used as the source for a Membership Join utilizing backup/historical database initialization. Rather, initialization of the replicator durable storage occurs upon initiating the membership join protocol. A member cannot leave the persistent membership if it is unable to send a Membership Change message, as occurs when the RCSM has not attained quorum. By requiring that the member be part of a quorum, it is ensured that at least one other member will record the exit of the leaving member, and therefore every member of the replication group will record the exit of the leaving member.

Eviction: Eviction occurs when a member is unable to voluntarily leave because it has crashed. In this case, another member must send a Membership Change message on behalf of the crashed member. A member may need to be evicted for several reasons: it crashed holding distributed locks which are needed, the server has crashed unrecoverably (e.g., hardware failure), or an entrant crashed unrecoverably during database initialization. Once a member has been evicted from the persistent membership, all locks held by that member are released; the local copy of the lock queues at every other member is updated to reflect this.

Recovery Methodology

Quorum: In one embodiment of the present invention, a dynamic linear voting algorithm (e.g., such as the one described in "From Total Order to Database Replication," by Yair Amir and Ciprian Tutu, which was included in the previously incorporated U.S. Provisional Application No. 60/671,373; or the one described in "Dynamic voting algorithms for maintaining the consistency of a replicated database," Jajodia and Mutchler, 1990) with weighting in order to determine quorum. In one such case, every member has a fixed weight, chosen at the time the member joins the persistent membership. The weight is transmitted in the Membership Request message as well as in Membership Change messages and every member's weight is stored in every member's persistent storage. In one particular embodiment, quorum is attained if more than half of the sum of the weights of the members in the last quorum are present. The quorum requirements can be loosened (thereby allowing more quorums) by not counting members of the last quorum that have left or have been evicted. Without excluding members that have left or have been evicted, overly weighted members that have left the persistent membership can prevent any further quorums. Likewise in a replication group where every member has equal weight, it is impossible for the penultimate member to leave the persistent membership.

Determination of Most Up To Date Member: The most up to date method in the replicator module may be unable to determine a most up to date member if administrative data is removed upon change of the persistent membership. The most up to date method in the replicator module assumes that any Member that has no record of the last applied action from an arbitrary member must not have applied any actions from that arbitrary member, and therefore must need all actions from that arbitrary member. This is an invalid assumption if the persistent membership changed while a member was failed. In such a case, surviving members may have less administrative information than recovering members, leading to the inability to determine a most up to date member. To provide for this case, two versions of the persistent membership can be maintained: the active and inactive persistent membership. The active persistent membership contains all members that are currently part of the replication group. The inactive persistent membership contains all members that have left the active persistent membership, but whose removal from the active persistent membership may not be known to all members yet. Members in the inactive membership are removed when the associated Membership Change messages containing the inactive members have been marked Green on all members; that is, when those messages can be deleted (because they have been marked White). When members are removed from the inactive membership, the associated replicator administrative data for those removed members is also removed. Therefore, that administrative data is no longer needed as all members have applied the Membership Change message.

Recovery of Evicted Members: An evicted member does not know it has been evicted until it recovers. Upon recovery, all members send both the active persistent membership and the inactive persistent membership, and all store the latest versions of each. If, during recovery, the surviving and recovering members determine an evicted member is present, all cease recovery until the next view change. The evicted member leaves the GCS group, forcing a view change. A member considers itself evicted if it is not in either the active persistent membership or the inactive persistent membership. Members that upon recovery determine that they are in the inactive persistent membership recover up to the point that they apply their own leave Membership Change message. This allows evicted members to be used as source for backup/historical initialization.

Initial Membership

The initial persistent membership may be agreed upon before recovery of any member, or it may be empty. If empty, a server must be chosen to be the initial member. In one particular embodiment of the present invention, this is accomplished via a Self Join method. The Self Join method modifies the initial member's replicator durable storage to add the initial member directly to the persistent membership. Upon modification of the replicator durable storage the member contacts the GCS system, receives a view change, attains quorum, and enters forward processing. The initial member can now act as a registrar for additional members.

Alternatively, a set of servers may be designated as the initial members, as long as the durable storage at every server is appropriately initialized the servers may recover together. The absence of previous quorum information invalidates the quorum algorithm. To provide a previous quorum, each member during recovery simulates a previous quorum by considering the last quorum to be all the members in the initial persistent membership. Therefore, the first quorum is the weighted majority of the persistent membership.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for dynamically managing a persistent membership of a coordination group in a distributed environment, the coordination group including a number of sites included in the persistent membership, with one or more of the sites including a database and a registrar, the method comprising:
   receiving, by a registrar of a first site that is a member of the persistent membership, a Membership Request from an entrant seeking to become a member of the persistent membership, the Membership Request including an action identifier describing a last action applied to an entrant database associated with the entrant;
   modifying, by the registrar of the first site, the persistent membership for the entrant;
   responsive to the registrar receiving the Membership Request, disconnecting the registrar of the first site from the coordination group and inhibiting, by a distributed lock manager, updates to a first database while cotemporaneous to the inhibition of the updates the registrar of the first site initializes the entrant database for the entrant based at least in part on the last action identified by the action identifier in the Membership Request; and
   reconnecting, by the registrar of the first site, to the coordination group after initialization of the entrant database.

2. The method of claim 1 wherein should connection between the registrar of the first site and the entrant be severed, the entrant can reconnect to any available registrar via a group communication system providing an extended virtual synchrony service to the coordination group, and recover.

3. The method of claim 1 wherein the initialization of the entrant database is carried out using backup/historical initialization, and the action identifier (ID) uniquely identifies the persistent membership.

4. The method of claim 3 wherein in response to the registrar of the first site not containing historical update information for this action ID, the method further comprises refusing, by the registrar of the first site, to proceed.

5. The method of claim 1 further comprising:
   acquiring, by the registrar of the first site, a distributed lock on the coordination group and a name for the entrant;
   examining, by the registrar of the first site upon receiving the distributed lock, the persistent membership to ensure that no other site utilizes the name for the entrant; and
   refusing, by the registrar of the first site, to proceed with initializing the entrant database in response to the name for the entrant being already in use.

6. The method of claim 5 wherein acquiring the distributed lock is carried out by a fault tolerant distributed lock manager associated with the registrar of the first site, the method further comprising:
   aborting, by the fault tolerant distributed lock manager, any transactions in process;
   releasing, by the fault tolerant distributed lock manager, any locks held by the registrar of the first site; and
   disconnecting, by the registrar of the first site, from a group communication system providing an extended virtual synchrony service to the coordination group thereby allowing the registrar of the first site to provide a consistent snapshot to the entrant.

7. The method of claim 1 wherein the initialization of the entrant database is carried out using snapshot initialization, and the entrant database is initialized with contents of the first database.

8. The method of claim 1 wherein the initialization of the entrant database is carried out using verify/update initialization, the initializing further comprising:
   comparing contents of the entrant database and the first database;
   resolving discrepancies; and
   in response to the entrant including new data, creating, by the entrant, actions corresponding to the new data and indicating total persisted order of those actions is not yet known.

9. The method of claim 1 wherein the initialization of the entrant database is carried out using backup/historical initialization, the initializing further comprising:
   sending, by the registrar of the first site, Green actions after the last applied action at the entrant to the entrant, wherein the Green actions are those whose total persisted order is known and confirmed; and
   applying, by the entrant, the Green actions.

10. The method of claim 1 wherein the registrar of the first site is allowed to service the Membership Request from the entrant only if the first site has participated in at least one quorum.

11. A non-transitory computer-readable medium encoded with instructions that, when executed by a processor, cause the processor to carry out a process for dynamically managing a persistent membership of a coordination group in a distributed environment, the coordination group including a number of sites included in the persistent membership, with one or more of the sites including a database and a registrar, the process comprising:
   receiving, by a registrar of a first site that is a member of the persistent membership, a Membership Request from an entrant seeking to become a member of the persistent membership, the Membership Request including an action identifier describing a last action applied to an entrant database associated with the entrant;
   modifying, by the registrar of the first site, the persistent membership for the entrant;
   responsive to the registrar receiving the Membership Request, disconnecting the registrar of the first site from the coordination group and inhibiting, by a distributed lock manager, updates to a first database while cotemporaneous to the inhibition of the updates the registrar of the first site initializes the entrant database for the entrant based at least in part on the last action identified by the action identifier in the Membership Request; and
   reconnecting, by the registrar of the first site, to the coordination group after initialization of the entrant database.

12. The computer-readable medium of claim 11 wherein should connection between the registrar of the first site and the entrant be severed, the entrant can reconnect to any available registrar via a group communication system providing an extended virtual synchrony service to the coordination group, and recover.

13. The computer-readable medium of claim 11 wherein the initialization of the entrant database is carried out using backup/historical initialization, and the action identifier (ID) uniquely identifies the persistent membership.

14. The computer-readable medium of claim 13 wherein in response to the registrar of the first site not containing historical update information for this action ID, the method further comprises refusing, by the registrar of the first site, to proceed.

15. The computer-readable medium of claim 11, the process further comprising:
   acquiring, by the registrar of the first site, a distributed lock on the coordination group and a name for the entrant;
   examining, by the registrar of the first site upon receiving the distributed lock, the persistent membership to ensure that no other site utilizes the name for the entrant; and
   refusing, by the registrar of the first site, to proceed with initializing the entrant database in response to the name for the entrant being already in use.

16. The computer-readable medium of claim 15 wherein acquiring the distributed lock is carried out by a fault tolerant distributed lock manager associated with the registrar of the first site, the process further comprising:
   aborting, by the fault tolerant distributed lock manager, any transactions in process;
   releasing, by the fault tolerant distributed lock manager, any locks held by the registrar of the first site; and
   disconnecting, by the registrar of the first site, from a group communication system providing an extended virtual synchrony service to the coordination group thereby allowing the registrar of the first site to provide a consistent snapshot to the entrant.

17. The computer-readable medium of claim 11 wherein the initialization of the entrant database is carried out using snapshot initialization, and the entrant database is initialized with contents of the first database.

18. The computer-readable medium of claim 11 wherein the initialization of the entrant database is carried out using verify/update initialization, the initializing further comprising:
   comparing contents of the entrant database and the first database;
   resolving discrepancies; and
   in response to the entrant including new data, creating, by the entrant, actions corresponding to the new data and indicating total persisted order of those actions is not yet known.

19. The computer-readable medium of claim 11 wherein the initialization of the entrant database is carried out using backup/historical initialization, the initializing further comprising:
   sending, by the registrar of the first site, Green actions after the last applied action at the entrant to the entrant, wherein the Green actions are those whose total persisted order is known and confirmed; and
   applying, by the entrant, the Green actions.

20. The computer-readable medium of claim 11 wherein the registrar of the first site is allowed to service the Membership Request from the entrant only if the first site has participated in at least one quorum.

* * * * *